United States Patent
Nam et al.

(10) Patent No.: US 12,096,392 B2
(45) Date of Patent: Sep. 17, 2024

(54) METHODS AND APPARATUS FOR POSITIONING BASED ON MOTION OF MOBILE ANCHOR NODES

(71) Applicant: QUALCOMM Incorporated, San Diego, CA (US)

(72) Inventors: Wooseok Nam, San Diego, CA (US); Sony Akkarakaran, Poway, CA (US); Tao Luo, San Diego, CA (US); Jingchao Bao, San Diego, CA (US); Yucheng Dai, San Diego, CA (US); Peter Gaal, San Diego, CA (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 340 days.

(21) Appl. No.: 17/580,527

(22) Filed: Jan. 20, 2022

(65) Prior Publication Data
US 2023/0232363 A1    Jul. 20, 2023

(51) Int. Cl.
*H04W 4/02* (2018.01)
*H04W 24/10* (2009.01)
(Continued)

(52) U.S. Cl.
CPC ......... *H04W 64/003* (2013.01); *H04W 24/10* (2013.01); *H04W 48/04* (2013.01)

(58) Field of Classification Search
CPC ... H04W 64/003; H04W 24/10; H04W 48/04; H04W 88/18; H04W 4/027; H04W 64/00;
(Continued)

(56) References Cited

U.S. PATENT DOCUMENTS

2021/0282111 A1* 9/2021 Yamada ................ H04L 5/0051
2022/0132463 A1* 4/2022 Cha ........................ H04B 17/27
(Continued)

FOREIGN PATENT DOCUMENTS

| EP | 4017035 | 6/2022 |
|---|---|---|
| WO | WO 2020145727 | 7/2020 |
| WO | WO 2021027861 | 2/2021 |

OTHER PUBLICATIONS

Partial International Search Report—PCT/US2022/080440 ISA/EPO—Mar. 6, 2023.
(Continued)

*Primary Examiner* — Kenneth T Lam
(74) *Attorney, Agent, or Firm* — Thien T. Nguyen

(57) ABSTRACT

Positioning of a target user equipment (UE) using a mobile anchor node is supported by providing motion information for the mobile anchor node and/or measurement restrictions. The target UE receives motion information for the mobile anchor node, which may be an ordered list of points or, e.g., a motion path. The target UE may generate positioning measurements using the motion information for the mobile anchor node to determine the position of the mobile anchor node when it transmits positioning reference signals (PRS). The target UE may receive an indication of position measurement restriction if the mobile anchor node is moving. The target UE may receive PRS over a plurality of PRS occasions. The target UE may restrict measurement to only one PRS occasion, may generate and separately report measurements for each PRS occasions or may combine a plurality of measurements using filter coefficients provided by a location server.

44 Claims, 12 Drawing Sheets

(51) Int. Cl.
*H04W 48/04* (2009.01)
*H04W 64/00* (2009.01)

(58) Field of Classification Search
CPC ........ H04W 4/02; G01S 1/042; G01S 5/0205; G01S 5/0236
See application file for complete search history.

(56) References Cited

U.S. PATENT DOCUMENTS

2022/0279310 A1* 9/2022 Xiao .................... H04W 4/025
2022/0361137 A1* 11/2022 Baek .................... H04L 5/0078
2023/0337269 A1* 10/2023 Rao ..................... H04W 72/542

OTHER PUBLICATIONS

International Search Report and Written Opinion PCT/US2022/080440—ISA/EPO—May 25, 2023.

* cited by examiner

METHODS AND APPARATUS FOR POSITIONING BASED ON MOTION OF MOBILE ANCHOR NODES

BACKGROUND

Field

The subject matter disclosed herein relates to wireless communications systems, and more particularly to systems, methods, and devices that support positioning.

Relevant Background

Wireless communication systems are widely deployed to provide various telecommunication services such as telephony, video, data, messaging, positioning, and broadcasts. Typical wireless communication systems may employ multiple-access technologies capable of supporting communication with multiple users by sharing available system resources (e.g., bandwidth, transmit power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit). Additionally, UEs may communicate directly with each other using sidelink channels.

The location of UE may be useful or essential to a number of applications including emergency calls, navigation, direction finding, asset tracking and Internet service. The location of a UE may be estimated based on information gathered from various systems. In a cellular network implemented according to LTE or 5G NR, for example, a base station may send downlink reference signals with which positioning measurements are performed by a UE and/or the UE may send uplink reference signals with which positioning measurements are performed by the base stations. Additionally, sidelink reference signals may be transmitted by UEs and positioning measurements performed by a UE. The UE may compute an estimate of its own location using the positioning measurements in UE-based positioning or may send the positioning measurements to a network entity, e.g., location server, which may compute the UE location based on the positioning measurements in UE-assisted positioning.

SUMMARY

Positioning of a target user equipment (UE) using a mobile anchor node is supported by providing motion information for the mobile anchor node and/or measurement restrictions. The target UE receives motion information for the mobile anchor node, which may be an ordered list of points or, e.g., a motion path. The target UE may generate positioning measurements using the motion information for the mobile anchor node to determine the position of the mobile anchor node when it transmits positioning reference signals (PRS). The target UE may receive an indication of position measurement restriction if the mobile anchor node is moving. The target UE may receive PRS over a plurality of PRS occasions. The target UE may restrict measurement to only one PRS occasion, may generate and separately report measurements for each PRS occasions or may combine a plurality of measurements using filter.

In one implementation, a method performed by a target user equipment (UE) for supporting positioning of the target UE, includes receiving a positioning reference signal (PRS) configuration for a mobile anchor node; receiving motion information for the mobile anchor node; receiving PRS from the mobile anchor node based on the PRS configuration; and generating position information for the UE based on the PRS and the motion information for the mobile anchor node.

In one implementation, a target user equipment (UE) configured for supporting positioning of the target UE, includes a wireless transceiver configured to communicate with entities in a wireless network; at least one memory; and at least one processor coupled to the wireless transceiver and the at least one memory, wherein the at least one processor is configured to: receive, via the wireless transceiver, a positioning reference signal (PRS) configuration for a mobile anchor node; receive, via the wireless transceiver, motion information for the mobile anchor node; receive, via the wireless transceiver, PRS from the mobile anchor node based on the PRS configuration; and generate position information for the UE based on the PRS and the motion information for the mobile anchor node.

In one implementation, a target user equipment (UE) configured for supporting positioning of the target UE, includes means for receiving a positioning reference signal (PRS) configuration for a mobile anchor node; means for receiving motion information for the mobile anchor node; means for receiving PRS from the mobile anchor node based on the PRS configuration; and means for generating position information for the UE based on the PRS and the motion information for the mobile anchor node.

In one implementation, a non-transitory storage medium including program code stored thereon, the program code is operable to configure at least one processor in a target user equipment (UE) configured for supporting positioning of the target UE, the program code comprising instructions to: receive a positioning reference signal (PRS) configuration for a mobile anchor node; receive motion information for the mobile anchor node; receive PRS from the mobile anchor node based on the PRS configuration; and generate position information for the UE based on the PRS and the motion information for the mobile anchor node.

In one implementation, a method performed by a network entity for supporting positioning of a target user equipment (UE), includes obtaining a positioning reference signal (PRS) configuration for a mobile anchor node; obtaining motion information for the mobile anchor node; sending the PRS configuration to the target UE; and sending the motion information to the target UE.

In one implementation, a network entity configured for supporting positioning of a target user equipment (UE), includes an external interface configured to communicate with entities in a wireless network; at least one memory; and at least one processor coupled to the external interface and the at least one memory, wherein the at least one processor is configured to: obtain a positioning reference signal (PRS) configuration for a mobile anchor node; obtain motion information for the mobile anchor node; send, via the external interface, the PRS configuration to the target UE; and send, via the external interface, the motion information to the target UE.

In one implementation, a network entity configured for supporting positioning of a target user equipment (UE), includes means for obtaining a positioning reference signal (PRS) configuration for a mobile anchor node; means for obtaining motion information for the mobile anchor node; means for sending the PRS configuration to the target UE; and means for sending the motion information to the target UE.

In one implementation, a non-transitory storage medium including program code stored thereon, the program code is operable to configure at least one processor in a network entity for supporting positioning of a target user equipment (UE), the program code comprising instructions to: obtain a positioning reference signal (PRS) configuration for a mobile anchor node; obtain motion information for the mobile anchor node; send the PRS configuration to the target UE; and send the motion information to the target UE.

In one implementation, a method performed by a target user equipment (UE) for supporting positioning of the target UE, includes receiving an indication of positioning measurement restriction for positioning reference signals (PRSs) from a mobile anchor node that is in motion; receiving a plurality of PRS from the mobile anchor node; and generating positioning measurements for the plurality of PRS from the mobile anchor node based on the positioning measurement restriction.

In one implementation, a target user equipment (UE) configured for supporting positioning of the target UE, includes a wireless transceiver configured to communicate with entities in a wireless network; at least one memory; and at least one processor coupled to the wireless transceiver and the at least one memory, wherein the at least one processor is configured to: receive, via the wireless transceiver, an indication of positioning measurement restriction for positioning reference signals (PRSs) from a mobile anchor node that is in motion; receive, via the wireless transceiver, a plurality of PRS from the mobile anchor node; and generate positioning measurements for the plurality of PRS from the mobile anchor node based on the positioning measurement restriction.

In one implementation, a target user equipment (UE) configured for supporting positioning of the target UE, includes means for receiving an indication of positioning measurement restriction for positioning reference signals (PRSs) from a mobile anchor node that is in motion; means for receiving a plurality of PRS from the mobile anchor node; and means for generating positioning measurements for the plurality of PRS from the mobile anchor node based on the positioning measurement restriction.

In one implementation, a non-transitory storage medium including program code stored thereon, the program code is operable to configure at least one processor in a target user equipment (UE) for supporting positioning of the target UE, the program code comprising instructions to: receive an indication of positioning measurement restriction for positioning reference signals (PRSs) from a mobile anchor node that is in motion; receive a plurality of PRS from the mobile anchor node; and generate positioning measurements for the plurality of PRS from the mobile anchor node based on the positioning measurement restriction.

In one implementation, a method performed by a location server for supporting positioning of a target user equipment (UE), includes sending to the target UE an indication of positioning measurement restriction for positioning reference signals (PRSs) from a mobile anchor node that is in motion; and receiving a location information report from the target UE comprising one or more positioning measurements for a plurality of PRS from the mobile anchor node based on the positioning measurement restriction.

In one implementation, a location server configured for supporting positioning of a target user equipment (UE), includes an external interface configured to communicate with entities in a wireless network; at least one memory; and at least one processor coupled to the external interface and the at least one memory, wherein the at least one processor is configured to: send, via the external interface, to the target UE an indication of positioning measurement restriction for positioning reference signals (PRSs) from a mobile anchor node that is in motion; and receive, via the external interface, a location information report from the target UE comprising one or more positioning measurements for a plurality of PRS from the mobile anchor node based on the positioning measurement restriction. r coefficients provided by a location server.

In one implementation, a location server configured for supporting positioning of a target user equipment (UE), includes means for sending to the target UE an indication of positioning measurement restriction for positioning reference signals (PRSs) from a mobile anchor node that is in motion; and means for receiving a location information report from the target UE comprising one or more positioning measurements for a plurality of PRS from the mobile anchor node based on the positioning measurement restriction.

In one implementation, a non-transitory storage medium including program code stored thereon, the program code is operable to configure at least one processor in a location server for supporting positioning of a target user equipment (UE), the program code comprising instructions to: send to the target UE an indication of positioning measurement restriction for positioning reference signals (PRSs) from a mobile anchor node that is in motion; and receive a location information report from the target UE comprising one or more positioning measurements for a plurality of PRS from the mobile anchor node based on the positioning measurement restriction.

Figure 1A:
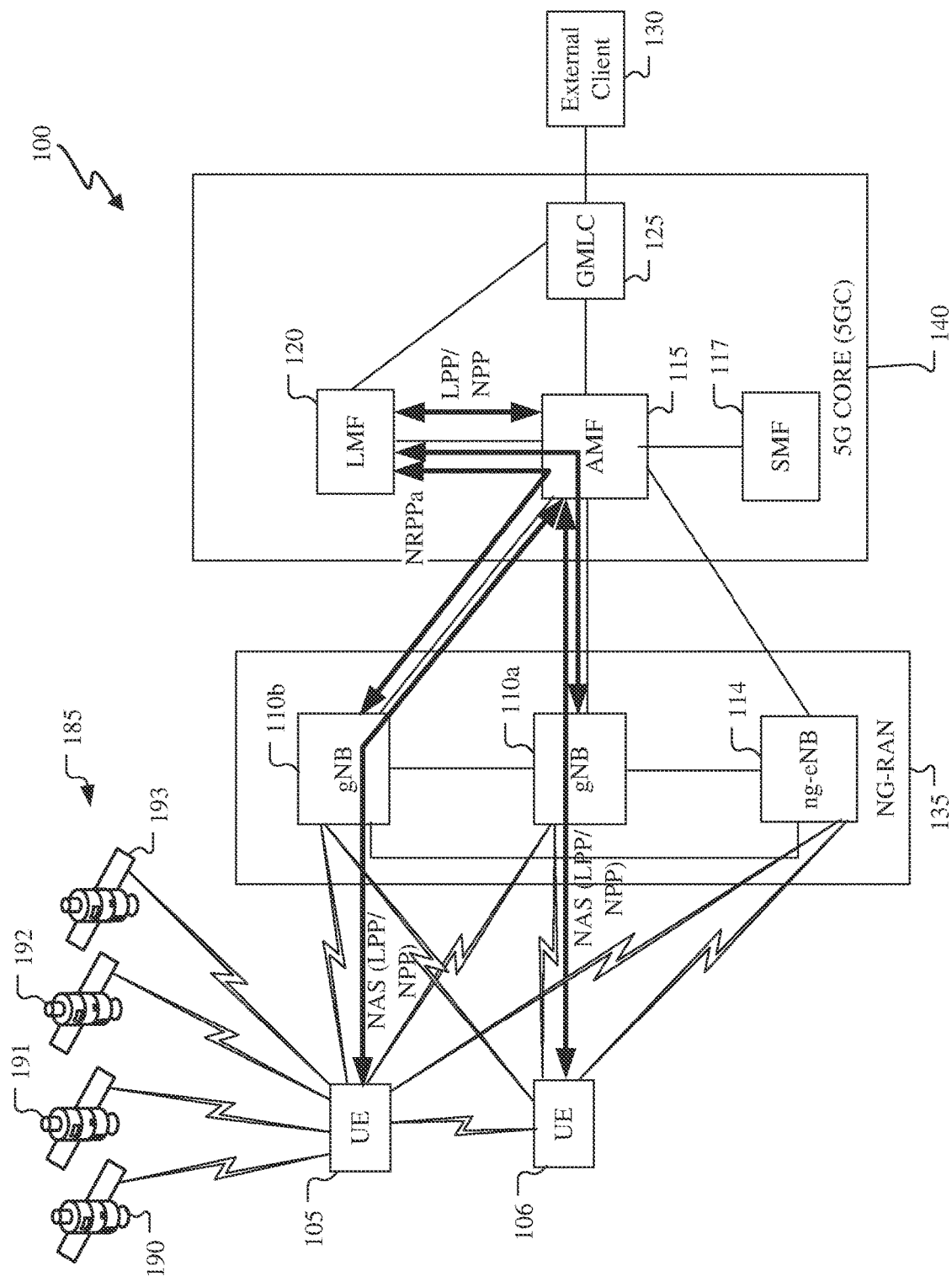
FIG. 1A shows an architecture of communication system including a number of UEs, a Radio Access Network (RAN), and a 5G Core Network (5GC).

Elements are indicated by numeric labels in the figures with like numbered elements in different figures representing the same element or similar elements. Different instances of a common element are indicated by following a numeric label for the common element with a distinct numeric suffix. In this case, a reference to the numeric label without a suffix indicates any instance of the common element.

DETAILED DESCRIPTION

Techniques and apparatus are discussed herein for positioning of a target user equipment (UE) using reference signals, such as sidelink (SL) positioning reference signals (PRS) from a mobile anchor node that is moving during the positioning session. The target UE may receive motion information for the mobile anchor node which the target UE may use to generate positioning measurements and a position estimate. The motion information for the mobile anchor node, for example, may be an ordered list of points or, e.g., a motion path, with which the position of the mobile anchor node at the time of transmission of the SL PRS may be determined. The target UE may additionally or alternative receive an indication of position measurement restriction if an anchor node is mobile. The target UE, for example, may receive SL PRS over a plurality of PRS occasions, and may generate positioning measurements based on the restriction. For example, the target UE may restrict measurement of SL PRS from the mobile anchor node to only one PRS occasion. In another example, the target UE may generate a positioning measurement for each PRS occasion, but instead of combining the measurements for reporting, may report each positioning measurement separately. In another example, the target UE may receive filter coefficients, e.g., from a location server, that are generated based on the movement of the mobile anchor node, the target UE may generate a positioning measurement for each PRS occasion and may combine the positioning measurements using the filter coefficient before reporting the combined positioning measurements.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a sidelink channel. As used herein the term traffic channel (TCH) can refer to either an uplink/reverse or downlink/forward or sidelink traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

FIG. 1A shows an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1A, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured wirelessly communicate to bi-directionally with the UE 105 and UE 106, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC 125 is communicatively coupled to an external client 130. The SMF 117 may serve as an initial contact point of a Service Control Function (SCF) (not shown) to create, control, and delete media sessions. The base stations 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the base stations 110a, 110b, 114 may be configured to communicate with the UEs 105 and 106 via multiple carriers. Each of the base stations 110a, 110b, 114 may provide communication coverage for a respective geographic region, e.g., a cell. Each cell may be partitioned into multiple sectors as a function of the base station antennas.

FIG. 1A provides a generalized illustration of various components, any or all of which may be utilized as appropriate, and each of which may be duplicated or omitted, as necessary. Specifically, although only UEs 105 and 106 are illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1A illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UEs 105, 106) or at base stations 110a, 110b, 114 and/or provide location assistance to the UEs 105, 106 (via the GMLC 125 or other location server) and/or compute a location for one or both of the UEs 105, 106 at a location-capable device such as the UEs 105, 106, the base stations 110a, 110b, or the LMF 120 based on measurement quantities received at the UEs 105, 106 or the base stations 110a, 110b, 114 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality, respectively.

The system 100 is capable of wireless communication in that components of the system 100 can communicate with one another (at least sometimes using wireless connections) directly or indirectly, e.g., via the base stations 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UEs 105, 106 may include multiple UEs and may be a mobile wireless communication device but may communicate wirelessly and via wired connections. The UEs 105, 106 may be any of a variety of devices, e.g., a smartphone, a tablet computer, a vehicle-based device, etc., but these are examples only as the UEs 105, 106 is not required to be any of these configurations, and other configurations of UEs may be used. Other UEs may include wearable devices (e.g., smart watches, smart jewelry, smart glasses, or headsets, etc.). Still other UEs may be used, whether currently existing or developed in the future. Further, other wireless devices (whether mobile or not) may be implemented within the system 100 and may communicate with each other and/or with the UEs 105, 106, the base stations 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UEs 105, 106 (e.g., via the GMLC 125).

The UEs 105, 106 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels, such as a physical sidelink synchronization channel (PSSCH), a physical sidelink broadcast channel (PSBCH), a physical sidelink control channel (PSCCH), sidelink channel state information reference signal (SL-CSIRS), physical sidelink feedback channel (PSFCH), or sidelink sounding reference signals (SL-SRS).

The UEs 105, 106 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UEs 105, 106 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UEs 105, 106 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UEs 105, 106 may support wireless communication using a Wireless Local Area Network (WLAN) which may connect to other networks (e.g., the Internet) using a Digital Subscriber Line (DSL) or packet cable, for example. The use of one or more of these RATs may allow the UEs 105, 106 to communicate with the external client 130 (e.g., via elements of the 5GC 140 not shown in FIG. 1A, or possibly via the GMLC 125) and/or allow the external client 130 to receive location information regarding the UEs 105, 106 (e.g., via the GMLC 125).

Each of the UEs 105, 106 may include a single entity or may include multiple entities such as in a personal area network where a user may employ audio, video and/or data I/O (input/output) devices and/or body sensors and a separate wireline or wireless modem. An estimate of a location of a UE, e.g., UE 105, may be referred to as a location, location estimate, location fix, fix, position, position estimate, or position fix, and may be geographic, thus providing location coordinates for the UE (e.g., latitude and longitude) which may or may not include an altitude component (e.g., height above sea level, height above or depth below ground level, floor level, or basement level). Alternatively, a location of the UE may be expressed as a civic location (e.g., as a postal address or the designation of some point or small area in a building such as a particular room or floor). A location of the UE may be expressed as an area or volume (defined either geographically or in civic form) within which the UE is expected to be located with some probability or confidence level (e.g., 67%, 95%, etc.). A location of the UE may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UEs 105, 106 may be configured to communicate with other entities using one or more of a variety of technologies. The UEs 105, 106 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1A include NR Node Bs, referred to as the gNBs 110a and 110b. Pairs of the gNBs 110a, 110b in the NG-RAN 135 may be connected to one another via one or more other gNBs. Access to the 5G network is provided to the UEs 105, 106 via wireless communication between the UEs and one or more of the gNBs 110a, 110b, which may provide wireless communications access to the 5GC 140 on behalf of the UE using 5G. In FIG. 1A, the serving gNB for the UE is assumed to be the gNB 110b, while the serving gNB for the UE 106 is assumed to be the gNB 110a, although another gNB may act as a serving gNB if the UEs 105, 106 move to another location or may act as a secondary gNB to provide additional throughput and bandwidth to the UEs 105, 106 and the UEs 105, 106 may share the same serving gNB.

Base stations (BSs) in the NG-RAN 135 shown in FIG. 1A may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNB s. The ng-eNB 114 may provide LTE wireless access and/or evolved LTE (eLTE) wireless access to the UEs 105, 106. One or more of the gNBs 110a, 110b and/or the ng-eNB 114 may be configured to function as positioning-only beacons which may transmit signals to assist with determining the position of the UEs 105, 106 but may not receive signals from the UEs 105, 106 or from other UEs.

The base stations 110a, 110b, 114 may each comprise one or more TRPs. For example, each sector within a cell of a base station may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Communications system 100 may support NR and support communications between the one or more base stations 110a, 110b, 114 and supported UEs 105 and 106. The UEs may be dispersed throughout the wireless communications system 100, and each UE may be stationary or mobile. As part of the communication, each of the base stations 110a, 110b, 114 and UEs 105 and 106 may support reference signal transmission for operations, including channel estimation, beam management and scheduling, and wireless device positioning within the coverage areas of one or more base stations.

For example, the base stations 110a, 110b, 114 may transmit one or more downlink reference signals for NR communications, including channel state information reference signal (CSI-RS) transmission. Each of the CSI-RS transmissions may be configured for a specific UE 105, 106 to estimate the channel and report channel quality information. The reported channel quality information may be used for scheduling or link adaptation at the base stations 110a, 110b, 114 or as part of a mobility or beam management procedure for directional transmission associated with the enhanced channel resources. Similarly, the UEs 105 and 106 may be configured to transmit uplink signals to one or more base stations 110a, 110b, 114 and sidelink transmissions between UEs 105 and 106.

The base stations 110a, 110b, 114 may transmit one or more additional downlink reference signals, including a positioning reference signal (PRS) transmission. The PRS transmission may be configured for a specific UE 105, 106, UE 106 to measure and report one or more report parameters (for example, report quantities) associated with positioning and location information. The PRS transmission and report parameter feedback may support various location services (for example, navigation systems and emergency communications). In some examples, the report parameters supplement one or more additional location systems supported by the UE 105, 106 (such as global positioning system (GPS) technology).

A base station 110a, 110b, 114 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 110a, 110b, 114. The structure of the one or more PRS resources, PRS resource sets, and PRS resource settings within a PRS transmission may be referred to as a multi-level resource setting. For example, multi-level PRS resource setting of the base station 110a, 110b, 114 may include multiple PRS resource sets and each PRS resource set may contain a set of PRS resources (such as a set of 4 PRS resources).

The UEs 105, 106 may receive the PRS transmission over the one or more PRS resources of the slot. The UEs 105, 106 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Similarly, the UEs 105, 106 may be configured to transmit one or more additional uplink reference signals that may be received by base stations 110a, 110b, 114 and used for positioning. For example, UEs 105 may transmit sounding reference signal (SRS) for positioning. Base stations 110a, 110b, 114 that receive uplink reference signals from a UEs 105, 106 may perform positioning measurements, such as one or more of a time of arrival (TOA), reception to transmission difference (UE Rx-Tx).

Aspects of wireless communications system 100 may include use of downlink PRS transmissions by the base station 110a, 110b, 114 or uplink SRS transmissions by a UE, e.g., UE 105 or UE 106, for UE location determination. For downlink-based UE location determination, a location server, e.g., LMF 120 in a NR network, or E-SMLC in LTE (sometimes referred to as location server 120), may be used to provide positioning assistance, such as PRS assistance data (AD) to the UE. For uplink-based UE location determination, a location server 120 and/or a serving base station, e.g., gNB 110a, may be used to provide positioning assistance, such as SRS assistance data, to receiving entities, such as base stations (e.g., gNBs 110a, 110b, and the other UE(s)). The SRS assistance data, for example, may include the SRS transmission occasion and other parameters, e.g., such as the reference signal pattern, power if different from nominal, the number of repetitions, etc.

A position estimation of the UE may be determined using reference signals, such as PRS signals or SRS for positioning signals, or other reference signals, from one or more base stations 110a, 110b, 114 or the UE. Positioning methods, such as Time Difference of Arrival (TDOA), DL Time Difference of Arrival (DL-TDOA), DL Angle of Departure (DL AoD), Enhanced Cell ID (ECID) are position methods that may be used to estimate the position of the UE using reference signals from base stations. TDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS)—e.g., as defined in 3GPP TS 36.211.

Other positioning methods may use reference signals transmitted by the UE including uplink based positioning methods and downlink and uplink based positioning methods. For example, uplink based positioning methods include, e.g., UL Time Difference of Arrival (UL-TDOA), UL Angle of Arrival (UL AoA), UL Relative Time of Arrival (UL-RTOA) and downlink and uplink based positioning methods, e.g., Round-trip time (RTT) with one or more neighboring base stations. Additionally, sidelink based positioning may be used in which UEs transmit and/or receive sidelink positioning reference signals that are measured and used for positioning.

As noted, while FIG. 1A depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UEs 105, 106, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1A.

The gNBs 110a, 110b and the ng-eNB 114 may communicate with the AMF 115, which, for positioning functionality, communicates with the LMF 120. The AMF 115 may support mobility of the UEs 105, 106, including cell change and handover and may participate in supporting a signaling connection to the UEs 105, 106 and possibly data and voice bearers for the UEs 105, 106. The LMF 120 may communicate directly with the UEs 105, 106, e.g., through wireless communications, or directly with the base stations 110a, 110b, 114. The LMF 120 may support positioning of the UEs 105, 106 when the UEs 105, 106 accesses the NG-RAN 135 and may support position procedures/methods such as Assisted GNSS (A-GNSS), Time Difference of Arrival (TDOA) (e.g., Downlink (DL) TDOA or Uplink (UL) TDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UEs 105, 106, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE) may be performed at the UE (e.g., using signal measurements obtained by the UE for signals transmitted by wireless nodes such as the gNBs 110a, 110b and/or the ng-eNB 114, and/or assistance data provided to the UE, e.g., by the LMF 120). At least part of the positioning functionality (including derivation of the location of the UE) alternatively may be performed at the LMF 120 (e.g., using signal measurements obtained by the gNBs 110a, 110b and/or the ng-eNB 114. The AMF 115 may serve as a control node that processes signaling between the UEs 105, 106 and the core network 140, and provides QoS (Quality of Service) flow and session management. The AMF 115 may support mobility of the UEs 105, 106 including cell change and handover and may participate in supporting signaling connection to the UEs 105, 106.

The GMLC 125 may support a location request for the UEs 105, 106 received from the external client 130 and may forward such a location request to the AMF 115 for forwarding by the AMF 115 to the LMF 120 or may forward the location request directly to the LMF 120. A location response from the LMF 120 (e.g., containing a location estimate for the UEs 105, 106) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1A, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1A, the LMF 120 and the UEs 105, 106 may communicate using an LTE Positioning Protocol (LPP), which may be defined in 3GPP TS 36.355. The LMF 120 and the UEs 105, 106 may also or instead communicate using a New Radio Positioning Protocol (which may be referred to as NPP or NRPP), which may be the same as, similar to, or an extension of LPP. Here, LPP and/or NPP messages may be transferred between the UEs 105, 106 and the LMF 120 via the AMF 115 and the serving gNB 110a, 110b or the serving ng-eNB 114 for the UEs 105, 106. For example, LPP and/or NPP messages may be transferred between the LMF 120 and the AMF 115 using a 5G Location Services Application Protocol (LCS AP) and may be transferred between the AMF 115 and the UEs 105, 106 using a 5G Non-Access Stratum (NAS) protocol. Communication between the LMF 120 and UEs 105, 106 using LPP protocol, may sometimes be referred to herein as direct communication, as the messages are transparent to the serving gNB, i.e., the serving gNB does not need to understand the content of the message, but simply forwards the communication between the LMF 120 and UEs 105, 106. In contrast, during communications using NPP protocol, such as NRPPa, the serving gNB unpacks the message, picks out the content, which is packed and sent to UE, e.g., in a Uu air interface via Radio Resource Control (RRC), Medium Access Control-Control Element (MAC-CE), Downlink Control Information (DCI), etc. The LPP and/or NPP protocol may be used to support positioning of the UEs 105, 106 using UE-assisted and/or UE-based position methods such as A-GNSS, RTK, TDOA, AOA, AOD, and/or E-CID. The NRPPa protocol may be used to support positioning of the UEs 105, 106 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional Synchronization Signal (SS) transmissions from the gNBs 110*a*, 110*b*, and/or the ng-eNB 114. The LMF 120 is illustrated in FIG. 1A as being located in the core network 140, but may be external to the core network 140, e.g., in an NG-RAN. For example, the LMF 120 may be co-located or integrated with a gNB or a TRP, or may be disposed remote from the gNB and/or the TRP and configured to communicate directly or indirectly with the gNB and/or the TRP.

With a UE-assisted position method, the UE, e.g., UE 105 or UE 106 may obtain location measurements and send the measurements to a location server (e.g., the LMF 120) for computation of a location estimate for the UE. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ), AOA, AOD, for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE, e.g., UE 105 or UE 106, may obtain location measurements (e.g., which may be the same as or similar to location measurements for a UE-assisted position method) and may compute a location of the UE (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114), sidelink UEs, or APs may obtain location measurements (e.g., measurements of RSSI, RTT, RSRP, RSRQ, AOA, AOD, or Time of Arrival (ToA) for signals transmitted by the UE, e.g., UE 105 or UE 106) and/or may receive measurements obtained by the UE. The one or more base stations or APs may send the measurements to a location server (e.g., the LMF 120) for computation of a location estimate for the UE.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UEs 105, 106 as assistance data in an LPP and/or NPP message via the NG-RAN 135 and the 5GC 140.

An LPP or NPP message sent from the LMF 120 to the UEs 105, 106 may instruct the UEs 105, 106 to do any of a variety of things depending on desired functionality. For example, the LPP or NPP message could contain an instruction for the UEs 105, 106 to obtain measurements for GNSS (or A-GNSS), WLAN, E-CID, and/or TDOA (or some other position method). In the case of E-CID, the LPP or NPP message may instruct the UEs 105, 106 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UEs 105, 106 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UEs 105, 106 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1A) in the 5GC 150. For example, the WLAN may support IEEE 802.11 WiFi access for the UEs 105, 106 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UEs 105, 106. In these other embodiments, positioning of the UEs 105, 106 using directional PRSs may be supported in an analogous manner to that described herein for a 5G network with the difference that functions and procedures described herein for the gNB s 110*a*, 110*b*, the ng-eNB 114, the AMF 115, and the LMF 120 may, in some cases, apply instead to other network elements such eNBs, WiFi APs, an MME, and an E-SMLC.

Positioning for UEs in a radio network, such as communication system 100 shown in FIG. 1A, typically uses Uu interfaces, i.e., radio interface between the UE and the radio access network, for DL PRS and/or UL PRS. Positioning for UEs may use sidelink PRS (SL-PRS), which may be a specific sidelink defined reference signal for positioning or may reuse Uu PRS, e.g., UL PRS, sometimes referred to as Sounding Reference Signal for positioning (SRSPos), or other reference signals may be transmitted in the sidelink channel. Sidelink positioning may enhance UE positioning by providing an additional transmission (or reception) node. A sidelink UE, such as UE 106, with a known position may be used to support position determination of a target UE, such as UE 105, where the sidelink UE is sometimes referred to as an anchor node.

Figure 1B:
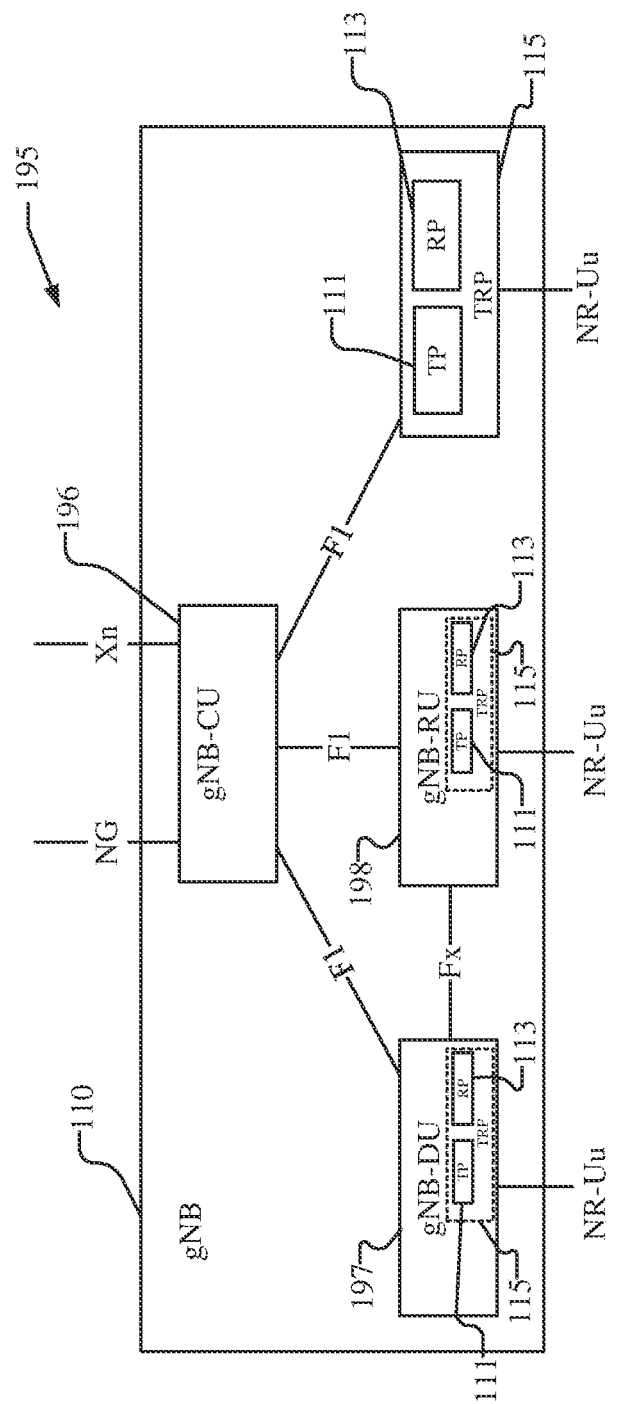
FIG. 1B shows an architecture diagram of an RAN node that may be within the RAN in FIG. 1A

FIG. 1B shows an architecture diagram of an NG-RAN node 195 that may be within an NG-RAN 135 in FIG. 1A, e.g., as a separate entity or as part of another gNB. The NG-RAN node 195 may be a TRP 110, according to one implementation. The architecture shown in FIG. 1A, for example, may be applicable to any TRP 110 in FIG. 1A.

As illustrated, TRP 110 may include a gNB Central Unit (gNB-CU) 196, a gNB Distributed Unit (gNB-DU) 197, a gNB Remote Unit (gNB-RU) 198, which may be physically co-located in the TRP 110 or may be physically separate. The gNB-CU 196 is a logical or physical node hosting support for Radio Resource Control (RRC), Service Data Adaptation Protocol (SDAP) and Packet Data Convergence Protocol (PDCP) protocols of the TRP 110 used over the NR Uu air interface and controlling the operation of one or more gNB-DUs and/or gNB-RUs. The gNB-CU 196 terminates an F1 interface connected with a gNB-DU and in some implementations, an F1 interface connected with a gNB-RU. As illustrated, the gNB-CU 196 may communicate with an AMF via an NG interface. The gNB-CU 196 may further communicate with one or more other gNBs 110 via an Xn interface. The gNB-DU 197 is a logical or physical node hosting support for Radio Link Control (RLC), Medium Access Control (MAC) and Physical (PHY) protocol layers used over the NR Uu air interface of the TRP 110, operation of which is partly controlled by gNB-CU 196. The gNB-DU terminates the F1 interface connected with the gNB-CU 196, and may terminate a lower layer split point interface Fx with a gNB-RU. The gNB-RU 198 may be based on a lower layer function split and is a logical or physical node hosting support for lower layer functions, such as PHY and Radio Frequency (RF) protocol layers used over the NR Uu air interface of the TRP 110, operation of which is partly controlled by gNB-CU 196 and/or gNB-DU 197. The gNB-RU 198 terminates the Fx interface connected with the gNB-DU 197 and in some implementations may terminate the F1 interface connected with the gNB-CU 196.

The gNB-CU 196 requests positioning measurements (e.g. E-CID) to the gNB-DU 197 and/or gNB-RU 198. The gNB-DU 197 and/or gNB-RU 198 may report the measurements back to the gNB-CU 196. A gNB-DU 197 or gNB-RU 198 may include positioning measurement functionality. It should be understood that a separate measurement node is not precluded.

Additionally, as illustrated in FIG. 1B, TRP 110 may include a Transmission Point (TP) 111 and a Reception Point (RP) 113 combined into a Transmission Reception Point (TRP) 115, which may be physically or logically located in the TRP 110. The gNB-CU 196 may be configured to communicate with the TP 111 and RP 113, e.g., via F1 interfaces. The gNB-CU 196, thus, controls one or more TPs 111 and RPs 113 which are accessible from the gNB-CU 196 via an F1 interface.

In some embodiments, the NG-RAN node 195 (or gNB 110) may comprise a subset of the elements shown in FIG. 1B. For example, the NG-RAN node 195 may comprise the gNB-CU 196 but may not include one or more of gNB-DU 197 and gNB-RU 198, RP 113, or TP 111. Alternatively, NG-RAN node 195 may include one or more of gNB-DU 197 and, RP 113 or TP 111 but may not include gNB-RU 198. Further, the elements shown in FIG. 1B may be logically separate but physically co-located or may be partially or completely physically separate. For example, one or more of gNB-DU 197 and/or gNB-RU 198, RP 113 or TP 111 may be physically separate from gNB-CU 196 or may be physically combined with gNB-CU 196. In the case of physical separation, the F1 or Fx interface may define signaling over a physical link or connection between two separated elements. In some implementations, gNB-CU 196 may be split into a control plane portion (referred to as a CU-CP or gNB-CU-CP) and a user plane portion (referred to as CU-UP or gNB-CU-UP). In this case, both the gNB-CU-CP and gNB-CU-UP may interact with gNB-DU 197 and/or gNB-RU 198 to support NR Uu air interface signaling for control plane and user plane, respectively. However, only the gNB-CU-CP may interact with TPs 111 and RPs 113 to support and control location related communication.

Protocol layering between the gNB-CU 196 and the TP 111, and RP 113 may be based on F1 C as defined in 3GPP TS 38.470, which uses an F1 Application Protocol (F1AP) at the top level as specified in 3GPP TS 38.473. New messages to support positioning could be added directly into F1AP or could be introduced in a new location specific protocol which is transported using F1AP.

The location procedures with the gNB-CU 196 may comprise all location related procedures on NG, Xn, and NR-Uu interfaces. For example, the location procedures between AMF 115 and the NG-RAN node 195 may use NGAP. The location procedures between NG-RAN node 195 and other NG-RAN nodes, e.g., gNBs 110, may use XnAP or a protocol above XnAP, such as an extended NR Positioning Protocol A (NRPPa) as defined in 3GPP TS 38.455. The location procedures between NG-RAN node 195 and UE 105 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC(LPP) messages may be carried in an UL/DL RRC (LPP) Message Transfer.

Figure 2:
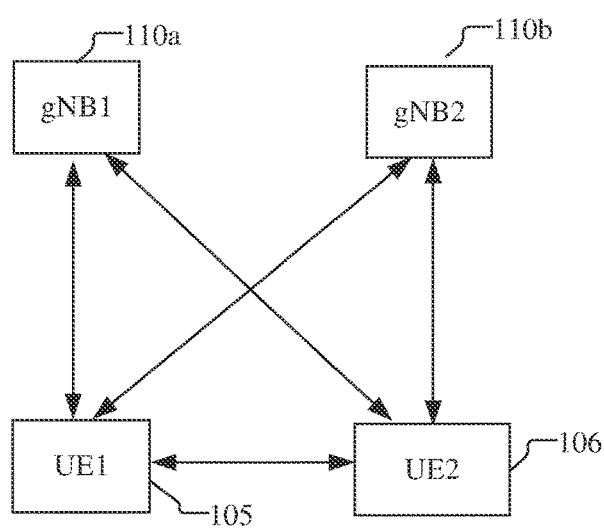
FIG. 2 illustrates a wireless communications system in which positioning of a UE may be performed using downlink and/or uplink signaling between base stations, a target UE 105, and a sidelink UE operating as an anchor node.

FIG. 2 illustrates a wireless communications system 200 in which positioning may be performed using downlink and/or uplink Uu signaling between base stations 110, e.g., gNB1 110*a*, gNB2 110*b*, and a target UE 105, and sidelink (SL) signaling between the target UE 105 and another UE 106, which may have a known position, e.g., which may be previously determined, and may thus be referred to as an anchor node 106. The downlink and/or uplink Uu signaling between UE 105 (and optionally anchor node 106) and base stations 110 may use Uu PRS for positioning, while the SL signaling between the target UE 105 and the anchor node 106 may use SL PRS for positioning or other reference signals for positioning.

Figure 3:
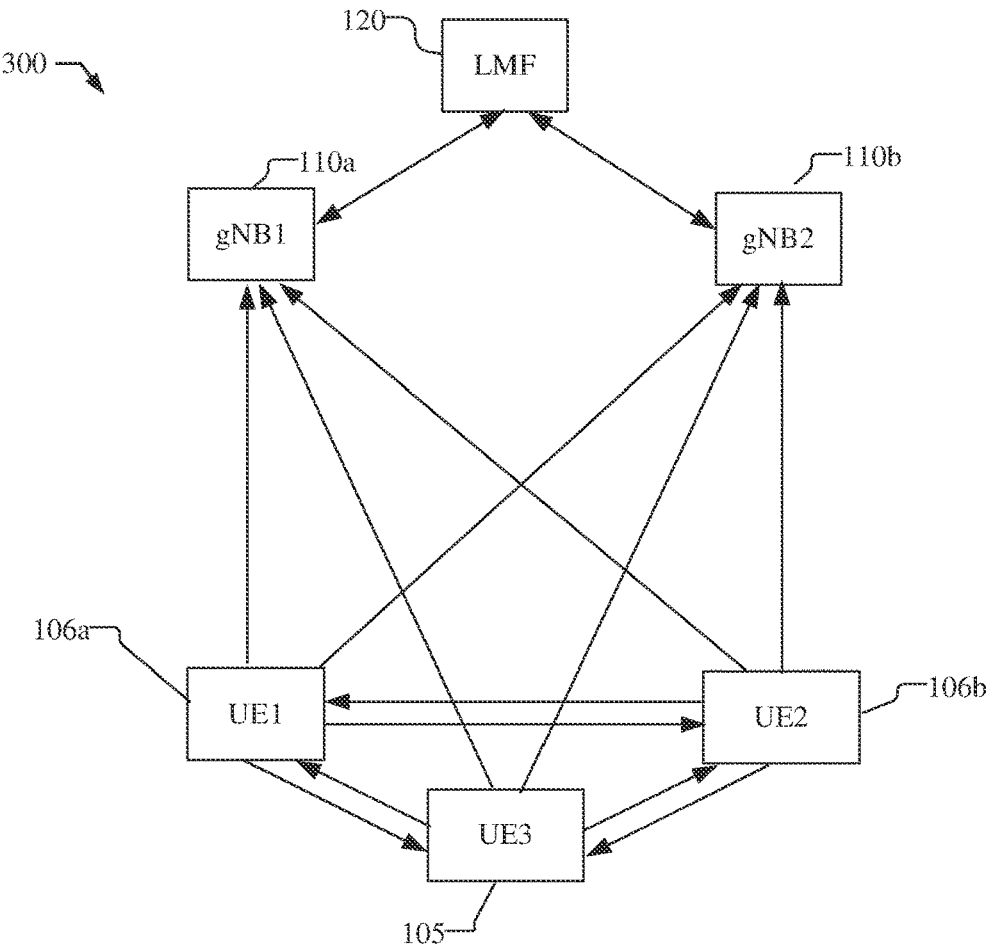
FIG. 3 illustrates another wireless communications system in which positioning of a target UE may be performed using downlink and/or uplink signaling between base stations, a target UE 105, and a multiple sidelink UEs operating as anchor nodes.

FIG. 3 illustrates a wireless communications system 300, similar to wireless communications system 200, but expanded to include multiple UEs, UE2 106*a* and UE3 106*b* (sometimes collectively referred to as UEs 106 or anchor nodes 106), which may be used as anchor nodes to assist in positioning target UE1 105, along with one or more base stations 110, e.g., gNB1 110*a*, gNB2 110*b*, in communication with a location server (e.g., LMF) 120. The SRS resources that are broadcast by the target UE 105 may be transmitted via Uu interface with gNBs 110 or via the SL interface with anchor nodes 106. For example, the target UE 105 may be configured to receive DL PRS and/or transmit UL SRS via the Uu interface with one or more gNBs 110 and to receive SL PRS and/or transmit SL PRS via the SL interface with anchor nodes 106. For example, the target UE 105 may be configured to broadcast or receive SRS in specific slot(s)/symbol(s) and/or specific resource. The anchor nodes 106 are similarly configured to receive the SL PRS and/or transmit the SL PRS via the SL interface with the target UE 105 with the configured specific slot(s)/symbol(s) and/or specific resource. The anchor nodes 106 may have known positions, e.g., which may be previously determined.

The location server 120 or the serving base station 110, e.g., gNB1 110*a*, may provide SRS configuration information, e.g., assistance data, to other base stations, e.g., gNB2 110*b*, and/or to other UEs, e.g., assisting UE 106. The SRS configuration information, for example, may include information such as the SRS transmission occasions and other parameters, including the reference signal pattern, reference signal power (e.g., if different from nominal), the number of repetitions, etc.

Various existing approaches for position determination of the target UE 105 rely on a combination of downlink or uplink signaling, such as RTT or TDOA. For example, DL PRS and UL SRS (via the Uu interface) may be used to generate RTT measurements for each of gNB1 110*a* and gBN2 110*b*, or DL PRS or UL SRS (via the Uu interface) may be used generate a TDOA measurement. Additional signaling for SL PRS (via the SL interface) with assisting UE 106 may be used to further generate an RTT measurement or additional TDOA measurements.

The use of an anchor node UE 106 may be advantageous to add more line of sight (LOS) links if the UEs have poor channel conditions, e.g., the number of visible base stations 110 or base stations 110 with a line of sight to the target UE 105 is insufficient for direct positioning of the target UE 105. For example, indoor factory channels, such as with Indoor Factory with Dense clutter and High base station height (InF-DH) or Indoor Factory with Dense clutter and Low base station height (InF-DL) have lower LOS probabilities. With the use of anchor nodes 106, the total number of LOS links that may be used for positioning includes both Uu links to gNB s 110 and SL links to anchor nodes 106.

Further, if the UEs have good channel condition, the use of anchor nodes 106 may improve the overall positioning accuracy by providing additional measurements.

Anchor nodes 106 may provide power efficient P2P positioning/ranging opportunities for public safety and other uses. For example, anchor nodes 106 may be used in a group of devices that are in an out of coverage scenario trying to determine relative positions of each other. The SL "sensing" (positioning for device-free object) may be handled in a joint framework with SL positioning.

During positioning, if the target UE 105 is mobile, the target UE 105 may report its trajectory, e.g., using the Sensor-MotionInformation information element (IE) in LPP. For example, a mobile target UE 105 may provide an ordered list of points where each point includes a time increment, a position change, and uncertainty in position change relative to the previous point and reference bearing angle. The position change, for example, may include the bearing, horizontal distance, and vertical distance. The positioning engine, e.g., the location server such as an E-SMLC in LTE, may use the trajectory with other UE and/or gNB measurements (e.g., DL-TDOA, cell-ID, etc.) to improve the positioning accuracy. Table 1, for example, illustrates a portion of the Sensor-MotionInformation IE for a mobile target UE in release 15.

TABLE 15

```
Displacement-r15 ::= SEQUENCE {
   bearing-r15                  INTEGER (0..3599),
   bearingUncConfidence-r15     INTEGER (0..100)    OPTIONAL,
   bearingRef-r15               ENUMERATED { geographicNorth,
magneticNorth, local },
   horizontalDistance-r15       INTEGER (0..8191),
   horizontalDistanceUnc-r15    INTEGER (0..255)    OPTIONAL,
   horizontalUncConfidence-r15  INTEGER (0..100)    OPTIONAL,
   verticalDirection-r15        ENUMERATED {upward, downward}
      OPTIONAL,
   verticalDistance-r15         INTEGER(0..8191)    OPTIONAL,
   verticalDistanceUnc-r15      INTEGER (0..255)    OPTIONAL,
   verticalUncConfidence-r15    INTEGER (0..100)    OPTIONAL,
   . . .
}
```

To enhance the mobility/trajectory reporting for a mobile target UE 105, the motion state of the target UE 105 may also be reported. For example, instead of reporting past movement measured by sensors, the motion state of a mobile target UE 105 may be provided as a parameterized model of the target UE 105 movement, so that a future state may be projected from the past and current state of the target UE 105. Periodic or constrained movement of the target UE 105 may be better projected by the motion state than the motion information provided in the Sensor-MotionInformation IE.

During UE based DL positioning of the target UE 105, to assist positioning measurement and calculation at the target UE 105 (i.e., without reporting to a location server), information for an anchor node 106 may be provided to the target UE 105 in an NR-PositionCalculationAssistance IE. The anchor node 106 information may include the anchor location, the PRS beam transmitted by the anchor node 106, and the time synchronization information for the anchor node 106. Table 2, by way of example, illustrates an example of NR-PositionCalculationAssistance in release 16.

TABLE 2

```
NR-PositionCalculationAssistance-r16 ::= SEQUENCE {
   nr-TRP-LocationInfo-r16    NR-TRP-LocationInfo-r16
                              OPTIONAL, --Need ON
   nr-DL-PRS-BeamInfo-r16     NR-DL-PRS-BeamInfo-r16
                              OPTIONAL, --Need ON
   nr-RTD-Info-r16            NR-RTD-Info-r16
                              OPTIONAL, --Need ON
   . . .
}
```

Referring back to FIGS. 2 and 3, during SL or SL-assisted positioning of the target UE 105, an anchor node 106 may be mobile. For example, the anchor node 106 may be a vehicle, drone, or a handset with SL capability. Current positioning techniques for a target UE 105, however, may not efficiently handle mobile anchor nodes. For example, the location of a mobile anchor node 106 may change over time. Thus, the anchor location provided to the target UE 105 in the beginning of a positioning session may not be valid when the target UE 105 performs the measurements of the SL PRS transmitted by the mobile anchor node 106. Moreover, a mobile anchor node 106 may move during the positioning session, so that if a plurality of positioning measurements of SL PRS transmitted by the mobile anchor node 106 is performed during a positioning session, the mobile anchor node 106 may be at a different anchor location for each positioning measurement, which may lead to large errors and/or uncertainties in the resulting position of the target UE 105.

Unlike a target UE, the motion information of anchor nodes is not considered in conventional positioning techniques. Accordingly, the target UE 105 cannot project the position of a mobile anchor node 106 at a given time, e.g., at a PRS measurement occasion of the mobile anchor node 106.

Figure 4:
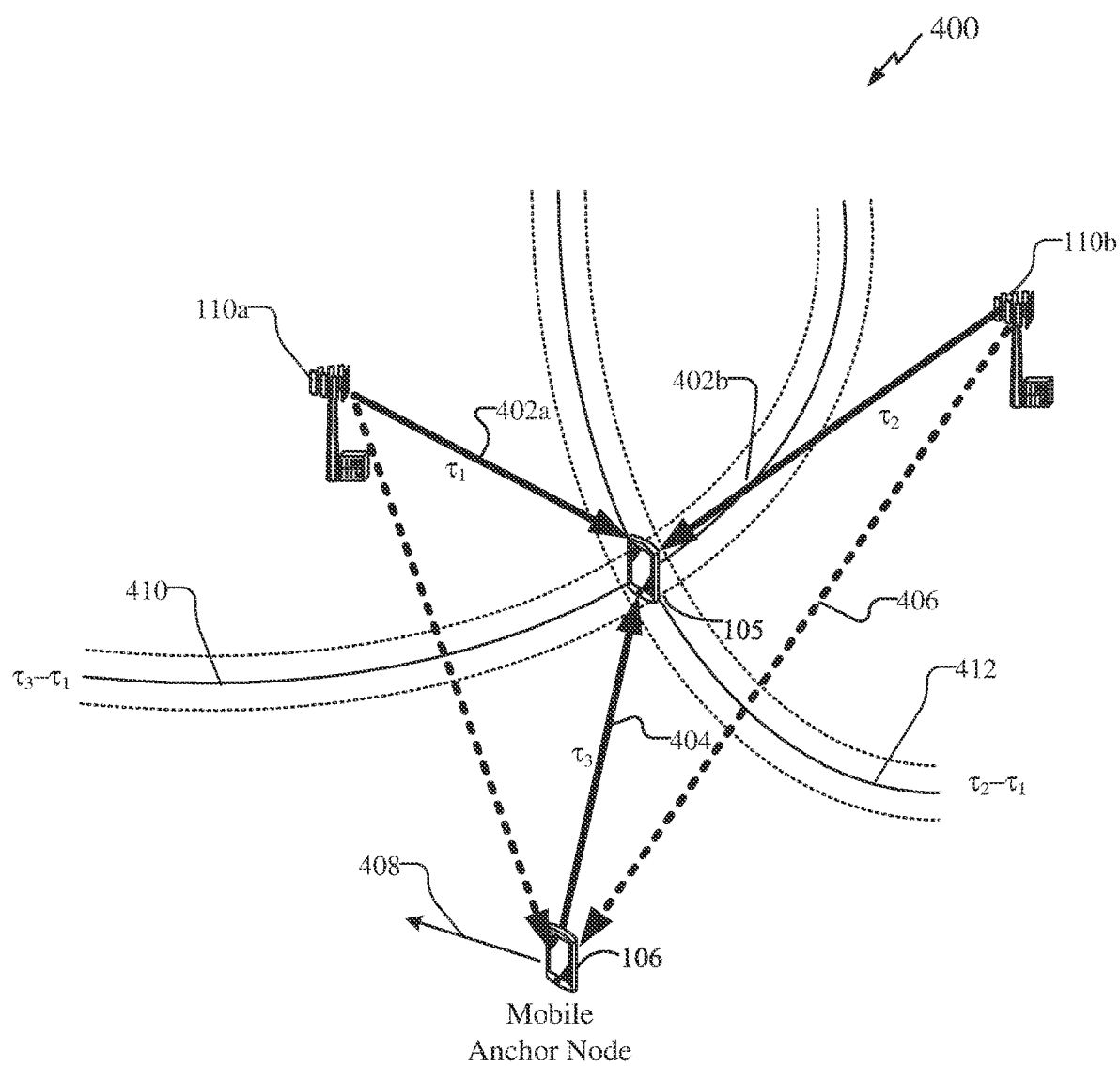
FIG. 4 illustrates an exemplary wireless communications system implementing positioning of a target UE using a Time Difference of Arrival (TDOA) technique with reference signals from base stations and a mobile anchor node.

FIG. 4, by way of example, illustrates an exemplary wireless communications system 400 implementing positioning of a target UE 105 using a Time Difference of Arrival (TDOA) technique with DL PRS 402a, 402b, and SL PRS 404 received from gNBs 110a, 110b and anchor node 106, respectively. As illustrated, the anchor node 106 may additionally receive DL PRS 406a, 406b from gNB s 110a, 110b, and may receive SL PRS from UE 105, with which the anchor node 106 may also perform positioning.

The target UE 105 may use the TDOA (e.g., OTDOA) positioning method, which is a multilateration method in which the UE conventionally measures the time of arrival (TOA) of the reference RF signals (e.g., PRS, SRS CRS, CSI-RS, etc.) transmitted by different pairs of network nodes (e.g., gNBs 110a, 110b and anchor node 106). Transmission and/or reception beamforming at the base stations and/or target UE 105 may enable wideband bandwidth for increased precision. The TOA from several neighbor nodes may be subtracted from a TOA from a reference node to determine the RSTDs for the network node pairs.

Generally, RSTDs are measured between a reference network node and one or more neighbor network nodes. In the example illustrated in FIG. 4, gNB 110a may be the serving base station for target UE 105 and may further serve as the reference base station, while gNB 110b and anchor node 106 may serve as the neighboring nodes. The reference network node may remain the same for all RSTDs measured by the target UE 105 for any single positioning use of TDOA and would typically correspond to the serving cell for the target UE 105 or another nearby cell with good signal strength at the target UE 105. The RSTD is conventionally the relative timing difference between two nodes, e.g., the reference node and the neighboring node, which may be determined based on the smallest time difference between two subframe boundaries from the two different nodes.

The location computation can be based on the measured time differences (e.g., RSTDs) and knowledge of the nodes' locations and relative transmission timing (e.g., regarding whether network nodes are accurately synchronized or whether each network node transmits with some known time difference relative to other network nodes).

To assist positioning operations, a location server (e.g., LMF 120 shown in FIG. 1A) may provide TDOA assistance data to the target UE 105 for the reference network node (e.g., gNBs 110a) and the neighbor nodes (e.g., gNBs 110b and anchor node 106) relative to the reference network node. For example, the assistance data may provide the center channel frequency of each network node, various reference RF signal configuration parameters (e.g., the number of consecutive positioning subframes, periodicity of positioning subframes, muting sequence, frequency hopping sequence, reference RF signal ID, reference RF signal bandwidth), a network node global ID, and/or other cell related parameters applicable to TDOA, as described above. The TDOA assistance data may also indicate the serving cell for the target UE 105 as the reference network node.

In an aspect, while the location server (e.g., LMF 120) may send the assistance data to the target UE 105, additionally or alternatively, the assistance data may originate directly from the network nodes (e.g., gNBs 110a, 110b, or anchor node 106) themselves (e.g., in periodically broadcasted overhead messages, etc.). Alternatively, the target UE 105 can detect neighbor network nodes itself without the use of assistance data.

In the example of FIG. 46, the measured time differences between the reference node, e.g., gNB 110a, and the neighboring nodes, e.g., gNB 110b and anchor cell 106 are represented as $\tau 2-\tau 1$ and $\tau 3-\tau 1$, where $\tau 1$, $\tau 2$, and $\tau 3$ represent the reception time of a reference RF signal from the transmitting antenna(s) of gNB 110a, 110b and anchor cell 106, respectively, by the target UE 105, and includes any measurement noise at the target UE 105. The target UE 105 may then convert the ToA measurements for different network nodes to RSTD measurements (e.g., as defined in 3GPP TS 36.214 entitled "Physical layer; Measurements") and (optionally) send them to the location server 120 or use them for position estimation. Using (i) the RSTD measurements, (ii) the known absolute or relative transmission timing of each network node, (iii) the known position(s) of physical transmitting antennas for the reference and neighboring network nodes gNB 110a, 110b and anchor cell 106, and/or (iv) directional reference RF signal characteristics such as a direction of transmission, the target UE's 105 position may be determined (either by the target UE 105 or the location server (e.g., LMF 120)).

The ToA $T_i$ at the target UE 105 for the shortest path from node i is $T_i = \tau_i + D_i/c$, where $D_i$ is the Euclidean distance between the base stations i with location ($q_i$) and the target UE 105 with location (p), c is the speed of light in the air (299700 km/s), and $q_i$ is known through the cell information database. The Euclidean distance (i.e., the line distance between two points) is given by:

$$c(T_i - \tau_i) = \sqrt{2} R \sqrt{1 - \sin(\varphi_1)\sin(\varphi_2) - \cos(\varphi_1)\cos(\varphi_2)\cos(\beta_1 - \beta_2)}, \quad \text{eq. 1}$$

where D is the distance between two points on the surface of the earth, R is the radius of the earth (6371 km), $\varphi_1$, $\varphi_2$ is the latitude (in radians) of the first point and the latitude (in radians) of the second point, respectively, and $\beta_1$, $\beta_2$ is the longitude (in radians) of the first point and the latitude (in radians) of the second point, respectively.

In order to identify the ToA of a reference RF signal transmitted by a given network node, the target UE 105 first jointly processes all the resource elements (REs) on the channel on which that network node (e.g., gNB 110a) is transmitting the reference RF signal, and performs an inverse Fourier transform to convert the received RF signals to the time domain. The conversion of the received RF signals to the time domain is referred to as estimation of the Channel Energy Response (CER). The CER shows the peaks on the channel over time, and the earliest "significant" peak should therefore correspond to the ToA of the reference RF signal. Generally, a UE will use a noise-related quality threshold to filter out spurious local peaks, thereby presumably correctly identifying significant peaks on the channel. For example, a target UE 105 may choose a ToA estimate that is the earliest local maximum of the CER that is at least X dB higher than the median of the CER and a maximum Y dB lower than the main peak on the channel. The target UE 105 determines the CER for each reference RF signal from each network node in order to determine the ToA of each reference RF signal from the different network nodes.

The TOA measurements performed by the target UE 105 are related to the geometric distance between the target UE 105 and the node. In a 2-D Cartesian coordinate system, the (known) coordinates of a node may be denoted as $x_i = [x_i, y_i]T$ and the (unknown) coordinates of the target UE 105 may be denoted as $x_t = [x_t, y_t]T$. The RSTD measurements may be defined as the time difference between two nodes (modulo 1-subframe (1-ms)), and therefore, correspond to the range differences between a neighbor node and the reference node.

$$RSTD_{i,1} = \frac{\sqrt{(x_t - x_i)^2 + (y_t - y_i)^2}}{2} - \frac{\sqrt{(x_t - x_1)^2 + (y_t - y_1)^2}}{2} + (T_i - T_1) + (n_i - n_1) \quad \text{eq. 2}$$

In equation 2, $RSTD_{i,1}$ is the time difference between the neighboring node (e.g., gNB 110*b* or anchor node 106) and reference node (gNB 110*a*) measured at the target UE 105, $(T_i - T_1)$ is the transmit time offset between the nodes, referred to as a "Real Time Differences" (RTDs); $n_i$ and $n_1$ are the UE TOA measurement errors, and c is the speed of light.

At least two neighbor node measurements i are needed, but more than two neighbor base station measurements are desirable, and the system of equations may be solved in the least-squares, or weighted-least-squares sense. The transmit time offsets $(T_i-T_1)$ should (ideally) be zero in a synchronized network, and the equation above defines the time-difference-of-arrival (TDOA). Geometrically, each TDOA defines a hyperbola, illustrated as hyperbolas 410 and 412, where the width of the hyperbola is determined by the TDOA errors $(n_i-n_1)$ as shown in FIG. 4. If the coordinates of the gNBs 110*a*, 110*b* and the anchor node 106 and the transmit time offsets $(T_i-T_1)$ are known at the location server (e.g., LMF 120) or at the target UE 105, the position of the target UE 105 may be determined based on the intersection of the hyperbolas. Uncertainty in the network node coordinates or transmit time offsets will directly impact the accuracy of the UE location estimate.

Thus, for conventional TDOA measurements, very accurate and reliable knowledge of the network node locations is important. The gNBs 110*a* and 110*b* are stationary and thus their locations may be precisely known and do not change. In general, the location of the anchor node 106 may also be known, e.g., through GNSS or other positioning measurements for the anchor node 106.

The anchor node 106, however, may be mobile, as indicated by arrow 408. The anchor node 106 may be a vehicle, drone, or a handset with SL capability, and the location of the anchor node 106 may change over time. Thus, a location of the anchor node 106 provided to the target UE 105 (or the location server (LMF 120) in the beginning of a positioning session may not be valid when the target UE 105 performs measurements using signals from the anchor node 106.

Accordingly, in one implementation, motion information for the mobile anchor node may be provided to the target UE 105 with which the target UE 105 may use to determine positioning measurements. For example, the target UE 105 may receive SL PRS configuration information for the mobile anchor node 106, as well as motion information, such as trajectory information, for the mobile anchor node 106, e.g., in the same message (e.g., assistance data message) or in separate messages. The target UE 105 may use the SL PRS configuration to receive the SL PRS from the mobile anchor node and generate positioning measurements for the SL PRS based on the motion information for the mobile anchor node. The motion information may be provided to the target UE 105, e.g., as an ordered list of points and/or as a motion state. Further, additional information, such as beam and speed/Doppler may be provided along with the motion information.

Figure 5:
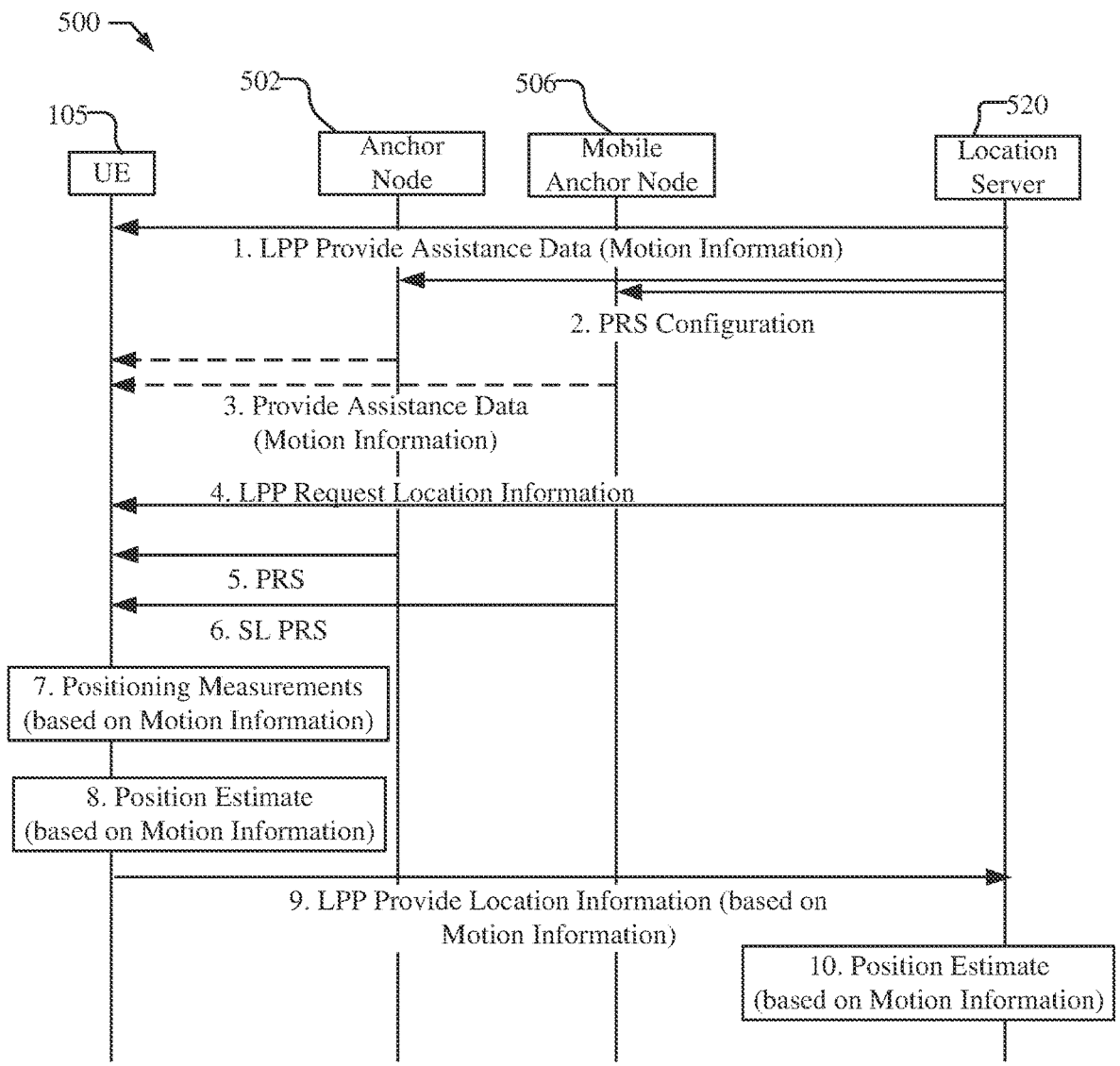
FIG. 5 is a message flow illustrating the messaging between a location server, anchor node, mobile anchor node, and the target UE for supporting positioning of the target UE using motion information for the mobile anchor node.

FIG. 5 is a message flow 500 illustrating the messaging between a location server 520 (such as LMF 120 shown in FIG. 1A), anchor node 502 (such as gNB 110*a*), mobile anchor node 506 (such as anchor node 106), and the target UE 105 for supporting positioning of the UE using motion information for the mobile anchor node 506, as discussed herein. It should be understood that FIG. 5 illustrates messages that are related to positioning of the target UE using the PRS measurements as discussed herein, but that additional messages, including conventional LPP messages, or fewer messages may be included in the message flow 500. For example, messaging to establish the positioning session and to determine capabilities of the UE 105 may be exchanged or assistance data may not be included. For example, implementation of the use of mobility information may depend on an indication from the target UE 105 that it is capable of using mobility information. Moreover, it should be understood that any desired PRS positioning measurements and corresponding techniques may be used, such as TDOA, AoA, M-RTT, etc. It should be understood that while SL PRS measurements are discussed, the PRS measurements may be Uu PRS, e.g., if the mobile anchor node 506 is a mobile Integrated Access and Backhaul (IAB) node or mobile relay node.

At stage 1, the location server 520 may send assistance data, e.g., in an LPP assistance data message, to the UE 105. The assistance data may include PRS configuration information for the anchor node 502 and the mobile anchor node 506 (if known). The PRS configuration information, for example, provides information related to the PRS resources to be received by the target UE 105 from the anchor nodes, such as the center channel frequency of each network node, various reference RF signal configuration parameters (e.g., the number of consecutive positioning subframes, periodicity of positioning subframes, muting sequence, frequency hopping sequence, reference RF signal ID, reference RF signal bandwidth), a network node global ID, and/or other related parameters. The location server 520 may further send the target UE 105 location information for the anchor node 502 and the mobile anchor node 506, e.g., for a UE based positioning process. The location information for the mobile anchor node 506, for example, may be a position of the mobile anchor node 506 at a reference time.

The location server 520 may further send the target UE 105 motion information for the mobile anchor node 506 (if known). The motion information may be sent through an LPP message, such as the LPP Provide Assistance Data message at stage 1 or another LPP message, or may be a broadcast message (posSIB) from the location server 520, from the anchor node 502, from the serving gNB, etc. The motion information for the mobile anchor node 506 provides information to project the position of the mobile anchor node from the position at the reference time to a future time (e.g., the time of transmission of the SL PRS by the mobile anchor node 506). The motion information may be represented by an ordered list of points. For example, each point may include at least a time increment, a position change (e.g., including bearing, horizontal distance, and vertical distance), and an uncertainty in position change, relative to a previous point. The motion information, for example, may be used to determine the priority of the SL PRS transmitted by the mobile anchor node 506. For example, the uncertainty in position change in the motion information may be used to determine priority of the SL PRS, as it serves as an indicator of the reliability of the SL PRS (e.g., synchronization accuracy, EVM (error vector magnitude), etc.) from the mobile anchor node 506. Each point may correspond to a moment in the past or future relative to the reception of the motion information by the target UE 105. Each point may be mapped to a PRS occasion of the mobile anchor node 506. For example, if the mobile anchor node 506 is an automated guided vehicle (AGV), its movement may be based on a predetermined schedule list, i.e., list of times and positions, which may be provided as the motion information. Additionally or alternatively, a motion state for the mobile anchor node 506 may be provided. The motion state, for example, may be provided as a path, surface, or volume of the motion of the mobile anchor node 506. By way of example, the motion state for the mobile anchor node 506 may be similar to ephemeris data used in GNSS which is used to project a position of a satellite vehicle on an orbit (path) at a given time. Further, additional information for the mobile anchor node 106, e.g., related to the transmission beam and speed, e.g., Doppler information, may be provided to the target UE 105 along with the motion information. The target UE 105, for example, may project the mobile anchor node 506 SL PRS transmit (Tx) beam and Doppler shift based on the beam and speed information.

At stage 2, the location server 520 may send the PRS configuration information to the anchor node 502 and mobile anchor node 506 for the PRS to be transmitted to the target UE 105.

At stage 3, the anchor node 502 and/or mobile anchor node 506 may send a message to the target UE 105 that may include all or part of the information discussed in stage 1, including the PRS configuration information, the motion information for the mobile anchor node 506, the beam and speed, e.g., Doppler information, for the mobile anchor node 506, etc. For example, the location server 520 may not have motion information for the mobile anchor node 506, which may be provided in stage 3 to the target UE 105. The motion information may be sent in a Provide Assistance Data or other type of message, which may be sent through unicast communication with the target UE 105, or may be broadcast by the anchor node 502 or mobile anchor node 506.

At stage 4, the location server 520 may send a location information request to the UE 105, e.g., in an LPP request location information message. The location information request or another message, for example, may be for one or more types of measurements, such as TDOA, AoA, RTT, etc., using PRS from the anchor node 502 and mobile anchor node 506 for positioning the target UE 105.

At stage 5, the anchor node 502 may transmit PRS that is received by the target UE 105, e.g., using the positioning assistance data (e.g., PRS configuration information) received at stages 1 and/or 3. The PRS may be DL PRS, e.g., if the anchor node 502 is a gNB, such as 110*a*, or may be SL PRS if the anchor node 502 is another UE.

At stage 6, the mobile anchor node 506 may transmit SL PRS that is received by the target UE 105, e.g., using the positioning assistance data (e.g., PRS configuration information) received at stages 1 and/or 3. The target UE 105 may additionally use the beam and speed information received at stages 1 and/or 3 to project or predict the SL PRS transmit (Tx) beam and Doppler shift from the mobile anchor node 506. The mobile anchor node 506 may be moving between stage 1 (and/or 3) and stage 6, and thus, the mobile anchor node 506 may transmit the SL PRS from a different position than the position associated with the reference time provided in the positioning assistance data in stage 1 and/or 3.

At stage 7, the target UE 105 generates positioning measurements for the PRS received from anchor node 502 and the SL PRS received from mobile anchor node 506 in stages 5 and 6. The position measurements, for example, may be TDOA, AoA, RTT, etc. In some implementations, the target UE 105 may generate positioning measurements for the PRS received and the SL PRS based on the motion information received at stages 1 and/or 3. For example, the target UE 105 may prioritize the PRS based on the motion information received in stages 1 and/or 3. The motion information, for example, may include an uncertainty in position change in the motion information for the mobile anchor node 506, which may serve as an indicator of the reliability of the SL PRS (e.g., synchronization accuracy, EVM (error vector magnitude), etc.) from the mobile anchor node 506. Prioritization of the PRS, for example, may be particularly useful if there are many nodes and/or PRS resources.

At stage 8, for UE based positioning, the target UE 105 may generate a position estimate using the positioning measurements generated at stage 8, using the motion information for the mobile anchor node 506 and using any position information received in the assistance data received at stages 1 and/or 3. For example, the motion information for the mobile anchor node 506 may be used to determine the position of the mobile anchor node 506 at the time of transmission of the SL PRS in stage 6, e.g., based on the mobile anchor node 506 position the reference time, which is projected to the time of transmission of the SL PRS using the motion information. The position of the mobile anchor node 506 at the time of transmission of the SL PRS may then be used, along with the position of the anchor node 502 and the positioning measurements, to determine a position estimate for the target UE 105, e.g., using TDOA, AoA, M-RTT, etc. The use of the position of the mobile anchor node 506 at the time of transmission of the SL PRS (as opposed to using the position of the mobile anchor node 506 at the reference time provided in stages 1 and/or 3) improves the positioning accuracy for the target UE 105. It should be understood that for a position estimate, positioning measurements from additional nodes may be used.

At stage 9, the UE 105 sends location information to the location server 520 in an LPP provide location information message based on the motion information. The location information, for example, may include the position estimate determined using motion information in stage 8 and/or the position measurements, which may be prioritized based on the motion information, e.g., as discussed in stage 7.

At stage 10, the location server 520 may determine a position estimate for the target UE 105 or verify the position estimate from the UE 105 based on the location information received in the message in stage 9 and positions of the anchor node 502 and mobile anchor node 506. The position estimate may be determined using the motion information for the mobile anchor node 506, e.g., by determining the position of the mobile anchor node 506 at the time of transmission of the SL PRS in stage 6, e.g., based on the mobile anchor node 506 position the reference time, which is projected to the time of transmission of the SL PRS using the motion information. The position of the mobile anchor node 506 at the time of transmission of the SL PRS may then be used, along with the position of the anchor node 502 and the positioning measurements, to determine a position estimate for the target UE 105, e.g., using TDOA, AoA, M-RTT, etc.

In one implementation, measurement restrictions may be implemented due to the presence of mobile anchor nodes.

For example, measurement restrictions may be used with UE-assisted positioning with one or more mobile anchor nodes.

Conventionally, positioning of a target UE 105 may require that the target UE 105 measure PRS during a plurality of measurement occasions, e.g., at least N_sample=4 occasions, for a measurement report. The target UE 105 may combine or filter the N_sample measurements to determine a single measurement report. There are a number of different ways in which the plurality of measurements may be combined or filtered, which may be selected based on platform implementations. If an anchor node is mobile, however, each of the N_sample measurements at different PRS occasions may correspond to different position for the anchor node. If the target UE 105 applies arbitrary and implementation-specific filtering across the plurality of measurements, the quality of the combined measurement may be degraded.

Accordingly, when one or more mobile anchor nodes are present, measurement restrictions may be implemented. For example, the target UE 105 may receive an indication from the location server or the mobile anchor node to restrict measurements, e.g., through LPP message or posSIB from the location server, or through unicast communication from the mobile anchor node. Various types of measurement restriction may be used. For example, the target UE may measure only the most recent single PRS occasion to derive a measurement report, which may be reported using configuration parameter, e.g., "timeRestrictionForPositioningMeasurements", that may be used for each mobile anchor node. In another example, the target UE may report an unfiltered set of N_sample measurements, instead of a single combined/filtered measurement, and the location server may use the raw measurements together with the mobile anchor position information to calculate the position of the target UE. In another example, the target UE may receive an indication of filter coefficients to be used with the measurements, and the target UE may combine/filter the measurements with the indicated filter coefficient, and report a single filtered measurement.

Figure 6:
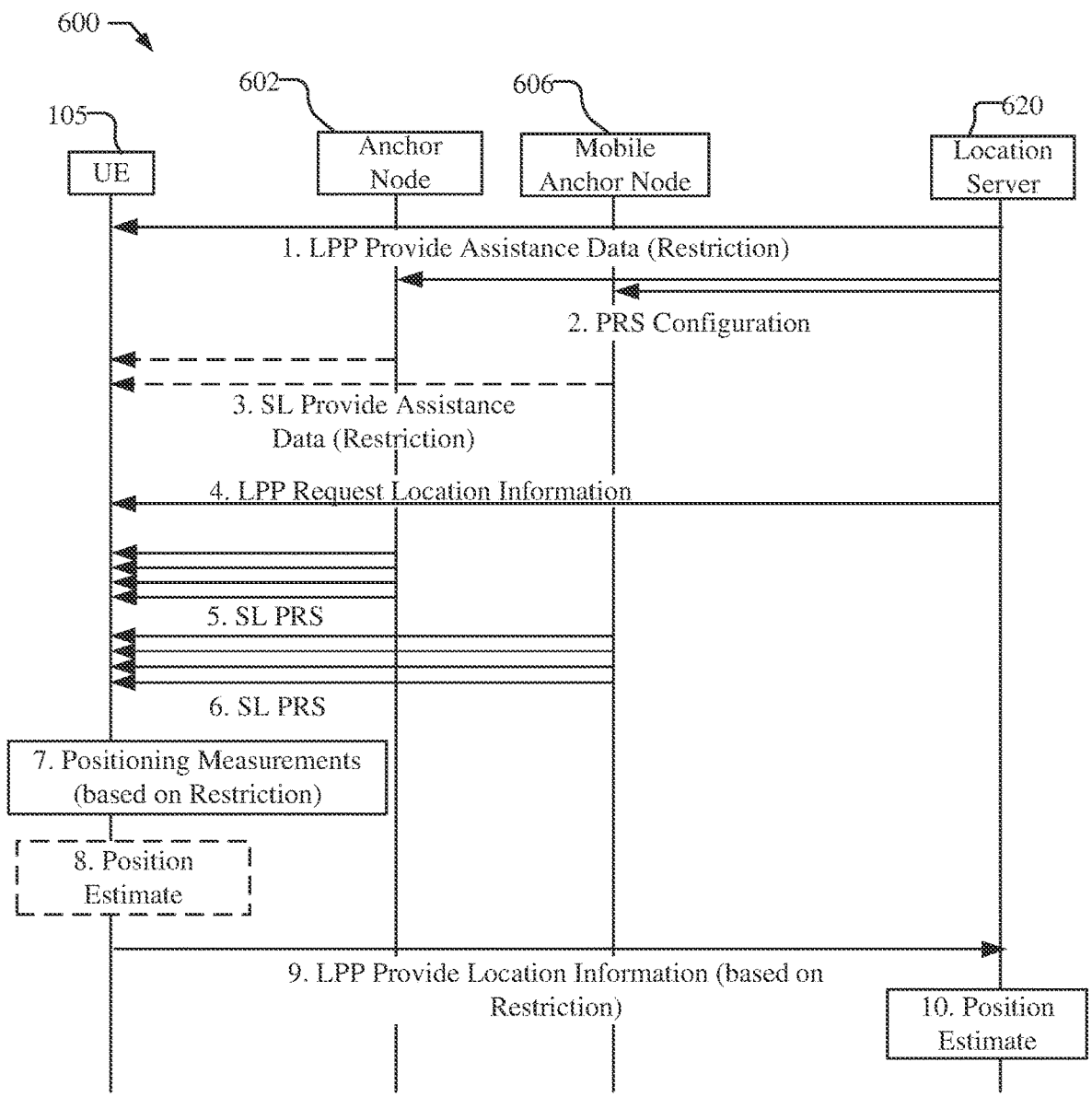
FIG. 6 is a message flow illustrating the messaging between a location server, anchor node, mobile anchor node, and the target UE for supporting positioning of the target UE using measurement restrictions.

FIG. 6 is a message flow 600 illustrating the messaging between a location server 620 (such as LMF 120 shown in FIG. 1A), anchor node 602 (such as gNB 110a), mobile anchor node 606 (such as anchor node 106), and the target UE 105 for supporting positioning of the UE using PRS measurement restrictions in the presence of one or more moving anchor nodes, as discussed herein. It should be understood that FIG. 6 illustrates messages that are related to positioning of the target UE using the PRS measurements as discussed herein, but that additional messages, including conventional LPP messages, or fewer messages may be included in the message flow 600. For example, messaging to establish the positioning session and to determine capabilities of the UE 105 may be exchanged or assistance data may not be included. For example, implementation of the use of measurement restrictions may depend on an indication from the target UE 105 that it is capable. Moreover, it should be understood that any desired PRS positioning measurements and corresponding techniques may be used, such as TDOA, AoA, M-RTT, etc. It should be understood that while SL PRS measurements are discussed, the PRS measurements may be Uu PRS, e.g., if the mobile anchor node 606 is a mobile Integrated Access and Backhaul (IAB) node or mobile relay node.

At stage 1, the location server 620 may send assistance data, e.g., in an LPP assistance data message, to the UE 105. The assistance data may include PRS configuration information for the anchor node 602 and the mobile anchor node 606 (if known). The PRS configuration information, for example, provides information related to the PRS resources to be received by the target UE 105 from the anchor nodes, such as the center channel frequency of each network node, various reference RF signal configuration parameters (e.g., the number of consecutive positioning subframes, periodicity of positioning subframes, muting sequence, frequency hopping sequence, reference RF signal ID, reference RF signal bandwidth), a network node global ID, and/or other related parameters. The location server 620 may further send the target UE 105 location information for the anchor node 602 and the mobile anchor node 606, e.g., for a UE based positioning process. The location information for the mobile anchor node 606, for example, may be a position of the mobile anchor node 606 at a reference time.

The location server 620 may further send the target UE 105 and indication of measurement restriction based on the presence of mobile anchor node 606. The indication of measurement restriction may be sent through an LPP message, such as the LPP Provide Assistance Data message at stage 1 or another LPP message, or may be a broadcast message (posSIB) from the location server 620, from the anchor node 602, from the serving gNB, etc. The indication of measurement restriction may simply indicate the presence of a mobile anchor node 606 or that measurement restriction is to be applied or may identify the type of measurement restriction to be applied. For example, the location server may indicate if the target UE 105 is to measure only the most recent single PRS occasion to derive a measurement report, or should report unfiltered set of N_sample measurements, instead of a single combined/filtered measurement, or may provide an indication of filter coefficients that the target UE 105 is to use with the measurements, e.g., where the target UE may combine/filter the measurements with the indicated filter coefficient, and report a single filtered measurement. The filter coefficients, for example, may be generated based on motion information for the mobile anchor node 606, e.g., to minimize the impact of the motion of the mobile anchor node 606 on the resulting filtered measurement. In some implementations, the location server 620 may provide motion information for the mobile anchor node 606, as discussed in FIG. 5.

At stage 2, the location server 620 may send the PRS configuration information to the anchor node 602 and mobile anchor node 606 for the PRS to be transmitted to the target UE 105.

At stage 3, the anchor node 602 and/or mobile anchor node 606 may send a message to the target UE 105 that may include all or part of the information discussed in stage 1, including the PRS configuration information, and an indication of measurement restriction due to the presence of the mobile anchor node 606. The indication of measurement restriction, for example, may be sent in a Provide Assistance Data or other type of message, and may be sent through unicast communication with the target UE 105, or may be broadcast by the anchor node 602 or mobile anchor node 606. In some implementations, the anchor node 602 and/or mobile anchor node 606 may provide motion information for the mobile anchor node 606, as discussed in FIG. 5.

At stage 4, the location server 620 may send a location information request to the UE 105, e.g., in an LPP request location information message. The location information request or another message, for example, may be for one or more types of measurements, such as TDOA, AoA, RTT, etc., using PRS from the anchor node 602 and mobile anchor node 606 for positioning the target UE 105.

At stage 5, the anchor node 602 may transmit PRS in a plurality of occasions that is received by the target UE 105, e.g., using the positioning assistance data (e.g., PRS configuration information) received at stages 1 and/or 3. The PRS may be DL PRS, e.g., if the anchor node 602 is a gNB, such as 110a, or may be SL PRS if the anchor node 602 is another UE.

At stage 6, the mobile anchor node 606 may transmit SL PRS in a plurality of occasions that is received by the target UE 105, e.g., using the positioning assistance data (e.g., PRS configuration information) received at stages 1 and/or 3. The mobile anchor node 606 may be moving between stage 1 (and/or 3) and stage 6, and thus, the mobile anchor node 606 may transmit the SL PRS in each occasion from a different position, which may all differ from the position associated with the reference time provided in the positioning assistance data in stage 1 and/or 3.

At stage 7, the target UE 105 generates positioning measurements for the PRS received from anchor node 602 in the SL PRS received from mobile anchor node 606 in stages 6 and 6 based on the indication of measurement restriction received at stages 1 and/or 3. The position measurements, for example, may be TDOA, AoA, RTT, etc. Various types of measurement restrictions may be used, which may be selected by the target UE 105 or may be selected by the location server 620 or the mobile anchor node 606 and indicated to the target UE 105, e.g., in the indication of measurement restriction received at stages 1 and/or 3. For example, the target UE 105 may measure only the most recent single PRS occasion to derive the measurement report for each mobile anchor node. In another example, the target UE 105 may measure PRS from each of the plurality of occasions, but not combine or filter the PRS measurements, e.g., where an unfiltered set of N_sample measurements, instead of a single combined/filtered measurement, is reported to the location server 620. In another example, the target UE may have received an indication of filter coefficients to be used with the measurements, e.g., with the indication of measurement restriction received at stages 1 and/or 3, and the target UE may combine/filter the PRS measurements from the plurality of occasions with the indicated filter coefficient, and report a single filtered measurement to the location server 620.

At stage 8, for UE-based positioning, the target UE 105 may generate a position estimate using the positioning measurements generated at stage 8 and using position information received in the assistance data received at stages 1 and/or 3, and the motion information for the mobile anchor node 606, if received, as discussed in FIG. 5.

At stage 9, the UE 105 sends location information to the location server 620 in an LPP provide location information message based on the indication of measurement restriction, e.g., received at stages 1 and/or 3. The location information, for example, may include the position measurements generated in stage 7. For example, the target UE 105 may report only measurement for the most recent single PRS occasion, which may be reported using a specific configuration parameter, such as "timeRestrictionForPositioningMeasurements", that may be used for each mobile anchor node 606. In another example, the target UE 105 may report an unfiltered set of measurements, e.g., as a vector of raw measurements for different PRS occasions, instead of a single combined/filtered measurement. In another example, the target UE 105 report a single filtered measurement, which was combined or filtered using the filter coefficients provided to the target UE 105, e.g., in stages 1 and/or 3. The target UE 105 may additionally include a position estimate for the target UE 105 in the location information report, if determined in stage 8.

At stage 10, the location server 620 may determine a position estimate for the target UE 105 or verify the position estimate from the UE 105 based on the location information received in the message in stage 9 and positions of the anchor node 602 and mobile anchor node 606. Where the location information report includes an unfiltered set of measurements, e.g., measurements for each occasion, the location server 620 may use the raw measurements together with the position of the mobile anchor node 606 to calculate the position of the target UE 105. The position estimate may be determined further using the motion information for the mobile anchor node 606, e.g., as discussed in FIG. 5. For example, the unfiltered set of measurements may be filtered by the location server 620 using the motion information. Moreover, the position calculation may use the position of the mobile anchor node 606 at a reference time and the motion information to project the position of the mobile anchor node 606 to a time associated with the filtered positioning measurements.

Figure 7:
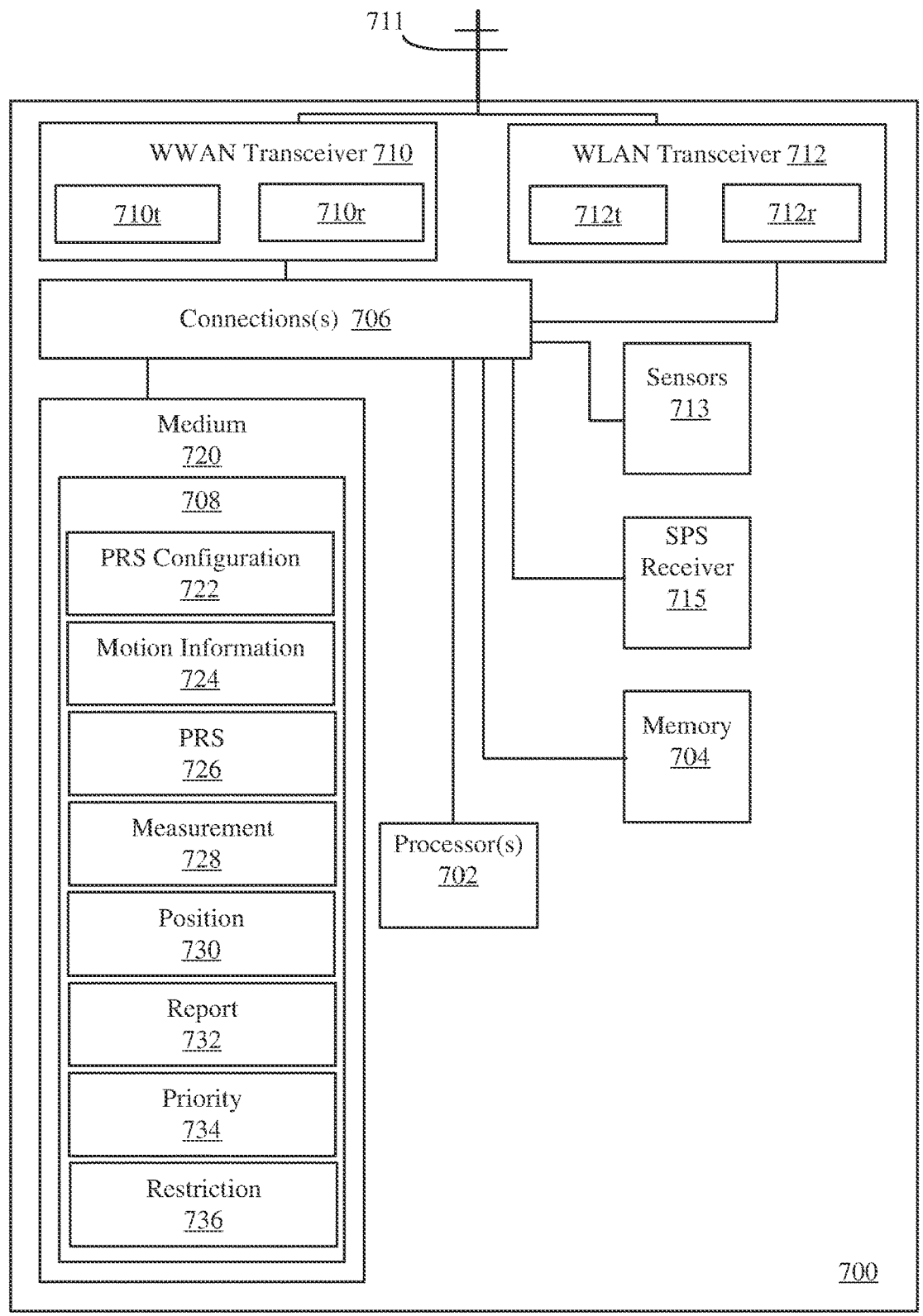
FIG. 7 shows a schematic block diagram illustrating certain exemplary features of a hardware implementation of a UE that is configured to support UE positioning using motion information and/or measurement restriction.

FIG. 7 shows a schematic block diagram illustrating certain exemplary features of a UE 700, e.g., which may be the target UE 105 or a mobile anchor node 106, 506, 606 shown in FIGS. 1A, and 3-6, that is configured to support position determination of a UE using motion information and/or measurement restriction, as discussed herein. The UE 700, for example, may perform the message flows shown in FIGS. 5 and 6, and the processes 900, 1000, and 1100 illustrated in FIGS. 9, 10, and 11 and algorithms disclosed herein. The UE 700 may, for example, include one or more processors 702, memory 704, an external interface such as at least one wireless transceiver (e.g., wireless network interface) illustrated as Wireless Wide Area Network (WWAN) transceiver 710 and Wireless Local Area Network (WLAN) transceiver 712, SPS receiver 715, and one or more sensors 713, which may be operatively coupled with one or more connections 706 (e.g., buses, lines, fibers, links, etc.) to non-transitory computer readable medium 720 and memory 704. The wireless transceiver (e.g. WWAN transceiver 710 and/or WLAN transceiver 712) may further include transceivers for Wireless Personal Area Network (WPAN), Wireless Metropolitan Area Network (WMAN), etc. The SPS receiver 715, for example, may receive and process SPS signals from SVs 190 shown in FIG. 1A. The one or more sensors 713, for example, may include a barometer and/or an inertial measurement unit (IMU) that may include one or more accelerometers, one or more gyroscopes, a magnetometer, etc. The UE 700 may further include additional items, which are not shown, such as a user interface that may include e.g., a display, a keypad or other input device, such as virtual keypad on the display, through which a user may interface with the UE. In certain example implementations, all or part of UE 700 may take the form of a chipset, and/or the like.

The at least one wireless transceiver may be a transceiver 710 for a WWAN communication system and a transceiver 712 for a WLAN communication system, or may be a combined transceiver for both WWAN and WLAN. The WWAN transceiver 710 may include a transmitter 710t and receiver 710r coupled to one or more antennas 711 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical)

signals and from wired (e.g., electrical and/or optical) signals to the wireless signals. The WLAN transceiver 712 may include a transmitter 712t and receiver 712r coupled to one or more antennas 711 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 710t and 712t may include multiple transmitters that may be discrete components or combined/integrated components, and/or the receivers 710r and 712r may include multiple receivers that may be discrete components or combined/integrated components. The WWAN transceiver 710 may be configured to communicate signals (e.g., with base stations and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio (NR) may use mm-wave frequencies and/or sub-6 GHz frequencies. The WLAN transceiver 712 may be configured to communicate signals (e.g., with access points and/or one or more other devices) according to a variety of radio access technologies (RATs) such as 3GPP LTE-V2X (PC5), IEEE 802.11 (including IEEE 802.11p), WiFi, WiFi Direct (WiFi-D), Bluetooth®, Zigbee etc. The wireless transceivers 710 and 712 may be communicatively coupled to a transceiver interface, e.g., by optical and/or electrical connection, which may be at least partially integrated with the wireless transceivers 710 and 712.

In some embodiments, UE 700 may include antenna 711, which may be internal or external. UE antenna 711 may be used to transmit and/or receive signals processed by wireless transceivers 710 and 712. In some embodiments, UE antenna 711 may be coupled to wireless transceivers 710 and 712. In some embodiments, measurements of signals received (transmitted) by UE 700 may be performed at the point of connection of the UE antenna 711 and wireless transceivers 710 and 712. For example, the measurement point of reference for received (transmitted) RF signal measurements may be an input (output) terminal of the receiver 710r (transmitter 710t) and an output (input) terminal of the UE antenna 711. In a UE 700 with multiple UE antennas 711 or antenna arrays, the antenna connector may be viewed as a virtual point representing the aggregate output (input) of multiple UE antennas. In some embodiments, UE 700 may measure received signals including signal strength and TOA measurements and the raw measurements may be processed by the one or more processors 702.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of UE 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in UE 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in UE 700 is merely exemplary, and as such the functionality of the modules and/or data structures may be combined, separated, and/or be structured in different ways depending upon the implementation of the UE 700.

The medium 720 and/or memory 704 may include a PRS configuration module 722 that when implemented by the one or more processors 702 configures the one or more processors 702 to receive, via the wireless transceiver 710, a SL PRS configuration for a mobile anchor node, e.g., from a network entity, such as a location server or mobile anchor node. Additionally, the one or more processors 702 may be configured to obtain a SL PRS configuration and to send, via the wireless transceiver 710, the SL PRS configuration to a target UE, e.g., when the UE 700 operates as a mobile anchor node. The SL PRS configuration, for example, may be included in positioning assistance data.

The medium 720 and/or memory 704 may include a motion information module 724 that when implemented by the one or more processors 702 configures the one or more processors 702 to receive, via the wireless transceiver 710, positioning assistance data that may include motion information for the mobile anchor node. The positioning assistance data, for example, may be received from one of a location server or the mobile anchor node. Additionally, the one or more processors 702 may be configured to obtaining motion information for the mobile anchor node and to send, via the wireless transceiver 710, positioning assistance data that may include the motion information for the mobile anchor node, e.g., when the UE 700 operates as a mobile anchor node. The positioning assistance data may further include a position of the mobile anchor node at a reference time, and the motion information for the mobile anchor node may be used to project a position of the mobile anchor node at a time of transmission of the SL PRS based on the position of the mobile anchor node at the reference time. The motion information, for example, may be represented by one of a path of motion, a surface of motion, or a volume of motion. Additionally, the positioning assistance data may include one of a velocity or Doppler information for the mobile anchor node, so that the target UE may determine the SL PRS configuration based on velocity or Doppler information.

The medium 720 and/or memory 704 may include a PRS module 726 that when implemented by the one or more processors 702 configures the one or more processors 702 to receive, via the wireless transceiver 710, SL PRS from the mobile anchor node based on the SL PRS configuration. The one or more processors 702, for example, may receive a plurality of PRS. Additionally, the one or more processors 702 may be configured to send, via the wireless transceiver 710, SL PRS to be measured by the target UE based on the motion information, e.g., when the UE 700 operates as a mobile anchor node.

The medium 720 and/or memory 704 may include a measurement module 728 that when implemented by the one or more processors 702 configures the one or more processors 702 to generate positioning measurements for the SL PRS based on the motion information for the mobile anchor node. The one or more processors 702 may be additionally or alternatively configured to generate positioning measurements for a plurality of SL PRS received from the mobile anchor node based on a positioning measurement restriction. For example, the one or more processors 702 may be configured to restrict a number of SL PRS used for generating the positioning measurements, such as restricting the number of SL PRS used for generating the positioning measurements by using only a most recent SL PRS for generating the positioning measurements. In another example, the one or more processors 702 may be configured to generate the positioning measurements for the plurality of SL PRS from the mobile anchor node based on the positioning measurement restriction by generating positioning measurements for each of the plurality of SL PRS, where each positioning measurement is separately reported. In another example, the positioning measurement restriction may include filter coefficients, and the one or more processors 702 may be configured to generate the positioning measurements for the plurality of SL PRS from the mobile anchor node based on the positioning measurement restriction by generating a positioning measurement for each of the plurality of SL PRS and combining the positioning measurement for each of the plurality of SL PRS using the filter coefficients to produce a single filtered positioning measurement, which may be reported.

The medium 720 and/or memory 704 may include a position module 730 that when implemented by the one or more processors 702 configures the one or more processors 702 to determine a position of the target UE based on the positioning measurements for the SL PRS and the motion information for the mobile anchor node, e.g., using TDOA, or other techniques discussed herein The medium 720 and/or memory 704 may include a report module 732 that when implemented by the one or more processors 702 configures the one or more processors 702 to send, via the wireless transceiver 710, a location information report to a location server that includes the positioning measurements for the SL PRS based on the motion information for the mobile anchor node. In some implementations, the one or more processors 702 may be additionally or alternatively configured to send, via the wireless transceiver 710, a location information report to a location server that separately reports each positioning measurement for each of the plurality of SL PRS, or to report a single filtered positioning measurement generated by combining the positioning measurement for each of the plurality of SL PRS using the filter coefficients.

The medium 720 and/or memory 704 may include a priority module 734 that when implemented by the one or more processors 702 configures the one or more processors 702 to determine a priority of at least one of the SL PRS, the mobile anchor node, or a combination thereof based on the uncertainty in a position change received in the positioning assistance data, wherein the priority is an indicator of reliability.

The medium 720 and/or memory 704 may include a restriction module 736 that when implemented by the one or more processors 702 configures the one or more processors 702 to receive, via the wireless transceiver 710, an indication of positioning measurement restriction for SL PRS from a mobile anchor node that is in motion. The indication of positioning measurement restriction, for example, may indicate restricting a number of SL PRS used for generating the positioning measurements, such as the using only a most recent SL PRS. The indication of positioning measurement restriction, for example, may indicate positioning measurements are generated for each of the plurality of SL PRS and each positioning measurement is reported. The indication of positioning measurement restriction, for example, may include filter coefficients, and indicate that positioning measurements are generated for each of the plurality of SL PRS and that the positioning measurements are combined using the filter coefficients prior to being reported.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program code 708. For example, the non-transitory computer readable medium including program code 708 stored thereon may include program code 708 to support position determination of a target UE using motion information and/or measurement restriction in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a wireless transceiver 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable program code 708 stored thereon, which if executed by one or more processors 702 may be operatively enabled to perform all or portions of the example operations as described herein. Computer readable medium 720 may be a part of memory 704.

Figure 8:
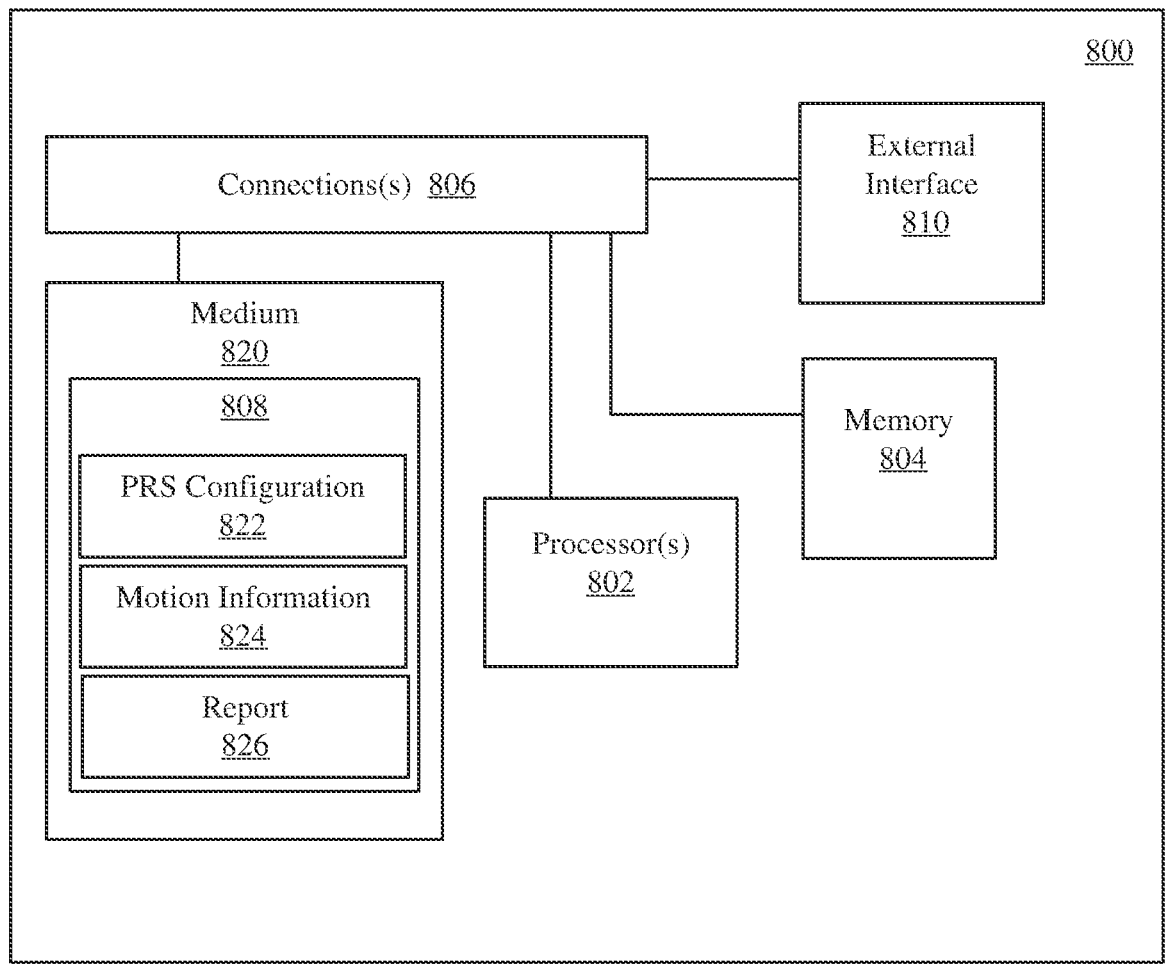
FIG. 8 shows a schematic block diagram illustrating certain exemplary features of a hardware implementation of a location server that is configured to support UE positioning using motion information and/or measurement restriction.

FIG. 8 shows a schematic block diagram illustrating certain exemplary features of a location server 800 that is configured to support position determination of a target UE using motion information and/or measurement restriction, as discussed herein. The location server 800, for example, may be a LMF 120 shown in FIGS. 1A and 3, or location server 520, 620 shown in FIGS. 5 and 6. The location server 800 may, for example, include one or more processors 802, memory 804, an external interface 810 (e.g., wireline or wireless network interface to base stations and/or entities in the core network), which may be operatively coupled with one or more connections 806 (e.g., buses, lines, fibers, links, etc.) to non-transitory computer readable medium 820 and memory 804. In certain example implementations, all or part of location server 800 may take the form of a chipset, and/or the like.

The one or more processors 802 may be implemented using a combination of hardware, firmware, and software. For example, the one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of location server 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in location server 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors.

A number of software modules and data tables may reside in the medium 820 and/or memory 804 and be utilized by the one or more processors 802 in order to manage both communications and the functionality described herein. It should be appreciated that the organization of the contents of the medium 820 and/or memory 804 as shown in location server 800 is merely exemplary, and as such the functionality of the modules and/or data structures may be combined, separated, and/or be structured in different ways depending upon the implementation of the location server 800.

The medium 820 and/or memory 804 may include a PRS configuration module 822 that when implemented by the one or more processors 802 configures the one or more processors 802 to obtain a SL PRS configuration for a mobile anchor node and to send, via the external interface 810, the SL PRS configuration to a target UE.

The medium 820 and/or memory 804 may include a motion information module 824 that when implemented by the one or more processors 802 configures the one or more processors 802 to obtain motion information for the mobile anchor node and to send, via the external interface 810, the motion information in positioning assistance data to a target UE. The positioning assistance data may further include a position of the mobile anchor node at a reference time, and the motion information for the mobile anchor node may be used to project a position of the mobile anchor node at a time of transmission of the SL PRS based on the position of the mobile anchor node at the reference time. The motion information, for example, may be represented by one of a path of motion, a surface of motion, or a volume of motion. Additionally, the positioning assistance data may include one of a velocity or Doppler information for the mobile anchor node, so that the target UE may determine the SL PRS configuration based on velocity or Doppler information.

The medium 820 and/or memory 804 may include a report module 826 that when implemented by the one or more processors 802 configures the one or more processors 802 to receive, via the external interface 810, a location information report from the target UE. The location information report may include at least one of positioning measurements for SL PRS received by the target UE from the mobile anchor node that are based on the motion information, a position of the target UE determined by the target UE based on positioning measurements for the SL PRS and the motion information for the mobile anchor node, or a combination thereof. The one or more processors 802 may be further configured to receive, via the external interface 810, a location information report including positioning measurements for a plurality of SL PRS from the mobile anchor node based on the positioning measurement restriction. For example, the location information report may include one positioning measurement generated based on a restricted number of SL PRS, a plurality of positioning measurements for each of the plurality of SL PRS separately measured by the target UE, or a single filtered positioning measurement generated based on a combination of positioning measurements for each of the plurality of SL PRS and the filter coefficients.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the one or more processors 802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program code 808. For example, the non-transitory computer readable medium including program code 808 stored thereon may include program code 808 to support position determination of a target UE using motion information and/or measurement restriction in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include an external interface 810 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable program code 808 stored thereon, which if executed by one or more processors 802 may be operatively enabled to perform all or portions of the example operations as described herein. Computer readable medium 820 may be a part of memory 804.

Figure 9:
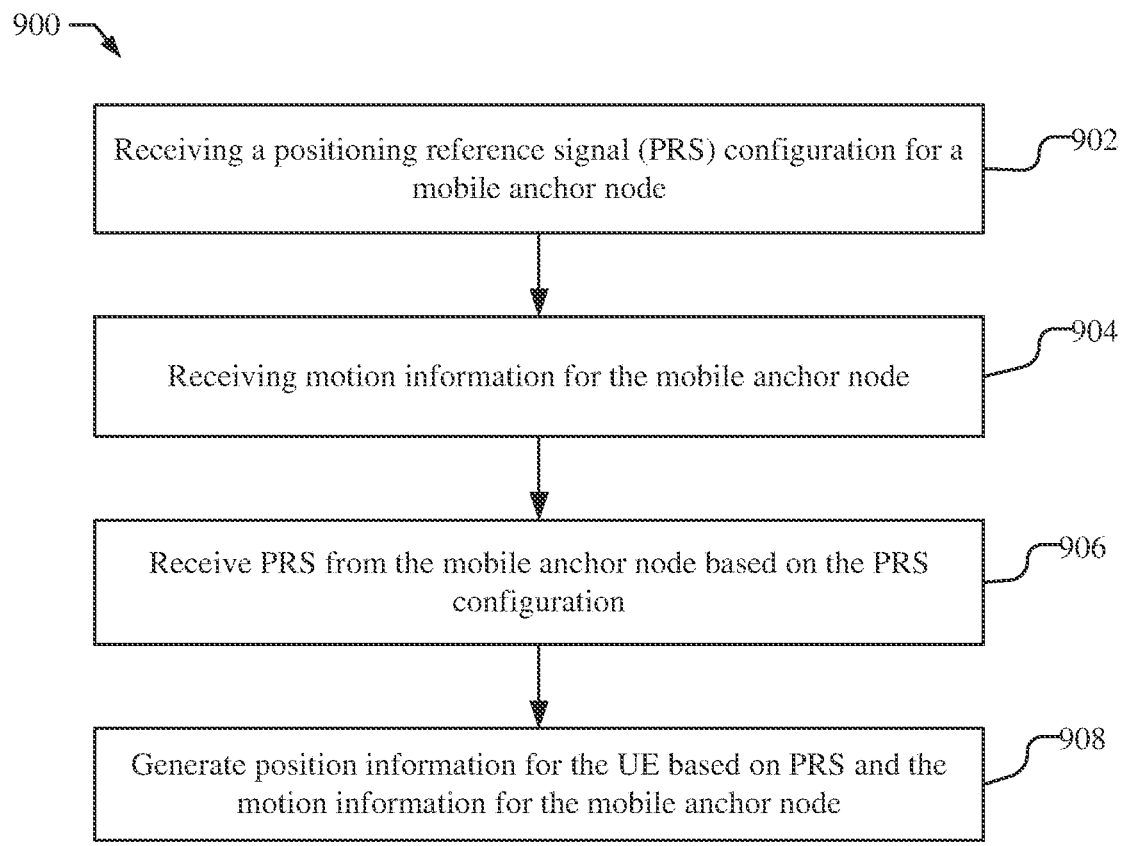
FIG. 9 shows a flowchart for an exemplary method performed by a target UE to support positioning of the target UE.

FIG. 9 shows a flowchart for an exemplary method 900, e.g., performed by a target UE, such as UE 105, shown in FIGS. 1A, 2, 3, 4, 5, 6, and 7, to support positioning of the target UE, in a manner consistent with disclosed implementation.

At block 902, the target UE receives a positioning reference signal (PRS) configuration for a mobile anchor node, e.g., as discussed at stages 1 and 3 of FIG. 5. A means for receiving a positioning reference signal (PRS) configuration for a mobile anchor node may be, e.g., the wireless transceiver 710 and one or more processors 702 with dedicated hardware or implementing executable code or software instructions in memory 704 and/or medium 720 such as the PRS configuration module 722 of UE 700.

At block 904, the target UE receives motion information for the mobile anchor node, e.g., as discussed at stages 1 and 3 of FIG. 5. In one implementation, for example, the PRS configuration and the motion information may be received in positioning assistance data. In one implementation, the positioning assistance data may further include a position of the mobile anchor node at a reference time, and the motion information for the mobile anchor node is used to project a position of the mobile anchor node at a time of transmission of the PRS based on the position of the mobile anchor node at the reference time. The motion information, for example, may be received from one of a location server, the mobile anchor node, an anchor node, or a base station. In some implementations, the motion information may be represented by one of a path of motion, a surface of motion, or a volume of motion. Additionally, the positioning assistance data may further include one of a velocity or Doppler information for the mobile anchor node, wherein the target UE determines the PRS configuration based on velocity or Doppler information. A means for receiving motion information for the mobile anchor node may be, e.g., the wireless transceiver 710 and one or more processors 702 with dedicated hardware or implementing executable code or software instructions in memory 704 and/or medium 720 such as the motion information module 724 of UE 700.

At block 906, the target UE receives PRS from the mobile anchor node based on the PRS configuration, e.g., as discussed at stage 6 of FIG. 5. The PRS, for example, may be sidelink (SL) PRS or Uu PRS. A means for receiving PRS from the mobile anchor node based on the PRS configuration may be, e.g., the wireless transceiver 710 and one or more processors 702 with dedicated hardware or implementing executable code or software instructions in memory 704 and/or medium 720 such as the PRS module 726 of UE 700.

At block 908, the target UE generates position information for the UE based on the PRS and the motion information for the mobile anchor node, e.g., as discussed at stages 7 and 8 of FIG. 5. A means for generating position information for the UE based on the PRS and the motion information for the mobile anchor node may be, e.g., the one or more processors 702 with dedicated hardware or implementing executable code or software instructions in memory 704 and/or medium 720 such as the measurement module 728 of UE 700.

In one implementation, the target UE may generate the position information for the UE by determining positioning measurements for the PRS based on a priority of the PRS determined from the motion information for the mobile anchor node, e.g., as discussed at stage 7 of FIG. 5. A means for determining positioning measurements for the PRS based on a priority of the PRS determined from the motion information for the mobile anchor node may be, e.g., the one or more processors 702 with dedicated hardware or implementing executable code or software instructions in memory 704 and/or medium 720 such as the position module 730 of UE 700.

In one implementation, the target UE may generate the position information for the UE by determining a position of the target UE based on positioning measurements for the PRS and the motion information for the mobile anchor node, e.g., as discussed at stage 8 of FIG. 5. A means for determining a position of the target UE based on positioning measurements for the PRS and the motion information for the mobile anchor node may be, e.g., the one or more processors 702 with dedicated hardware or implementing executable code or software instructions in memory 704 and/or medium 720 such as the position module 730 of UE 700.

In one implementation, the target UE may send a location information report to a location server that includes the position information for the UE, e.g., as discussed at stage 9 of FIG. 5. A means for sending a location information report to a location server that includes the position information for the UE may be, e.g., the one or more processors 702 with dedicated hardware or implementing executable code or software instructions in memory 704 and/or medium 720 such as the report module 732 of UE 700.

In some implementations, the motion information may be represented by an ordered list of points, e.g., as discussed in stages 1 and 3 of FIG. 5. For example, each point in the ordered list of points may include, relative to a previous point, a time increment, a position change, and an uncertainty in the position change. The target UE may determine a priority of at least one of the PRS, the mobile anchor node, or a combination thereof based on the uncertainty in the position change, wherein the priority is an indicator of reliability, e.g., as discussed at stage 7 of FIG. 5. A means for determining a priority of at least one of the PRS, the mobile anchor node, or a combination thereof based on the uncertainty in the position change, wherein the priority is an indicator of reliability may be, e.g., the one or more processors 702 with dedicated hardware or implementing executable code or software instructions in memory 704 and/or medium 720 such as the priority module 734 of UE 700. Each point may correspond to a past time or future time relative to reception of the motion information. Each point may correspond to a PRS occasion of the mobile anchor node.

Figure 10:
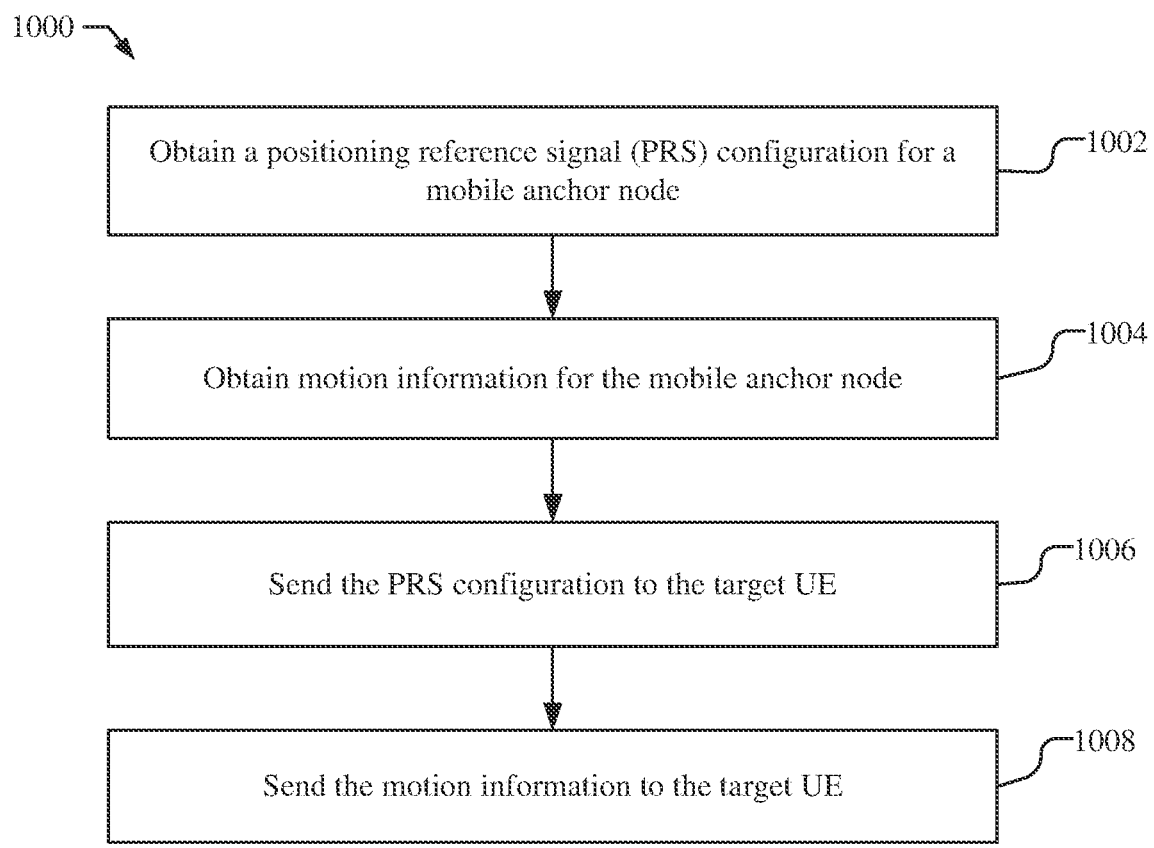
FIG. 10 shows a flowchart for an exemplary method performed by a location server to support positioning of a target UE.

FIG. 10 shows a flowchart for an exemplary method 1000, e.g., performed by a network entity, such as a location server 520, 620, 800 shown in FIGS. 5, 6, and 8, which may be an LMF 120, shown in FIGS. 1A and 3, a serving gNB such as gNB 110*a* shown in FIG. 1A, an anchor node such as anchor node 502, 602 shown in FIGS. 5 and 6 or a mobile anchor node, such as SL UE 106 shown in FIGS. 1A, 2, 3, 4, or mobile anchor node 506, 606, 700, shown in FIGS. 5, 6, and 7, to support positioning of a target UE, in a manner consistent with disclosed implementation.

At block 1002, the network entity obtains a positioning reference signal (PRS) configuration for a mobile anchor node, e.g., as discussed at stages 1 and 3 of FIG. 5. A means for obtaining a positioning reference signal (PRS) configuration for a mobile anchor node may be, e.g., the external interface 812 and one or more processors 802 with dedicated hardware or implementing executable code or software instructions in memory 804 and/or medium 820 such as the PRS configuration module 822 of location server 800; or the wireless transceiver 710 and one or more processors 702 with dedicated hardware or implementing executable code or software instructions in memory 704 and/or medium 720 such as the PRS configuration module 722 of UE 700.

At block 1004, the network entity obtains motion information for the mobile anchor node, e.g., as discussed at stages 1 and 3 of FIG. 5. A means for obtaining motion information for the mobile anchor node may be, e.g., the external interface 812 and one or more processors 802 with dedicated hardware or implementing executable code or software instructions in memory 804 and/or medium 820 such as the motion information module 824 of location server 800; or the one or more processors 702 with dedicated hardware or implementing executable code or software instructions in memory 704 and/or medium 720 such as the motion information module 724 of UE 700.

At block 1006, the network entity sends the PRS configuration to the target UE, e.g., as discussed at stages 1 and 3 of FIG. 5. A means for sending the PRS configuration to the target UE may be, e.g., the external interface 812 and one or more processors 802 with dedicated hardware or implementing executable code or software instructions in memory 804 and/or medium 820 such as the PRS configuration module 822 of location server 800; or the wireless transceiver 710 and one or more processors 702 with dedicated hardware or implementing executable code or software instructions in memory 704 and/or medium 720 such as the PRS configuration module 722 of UE 700.

At block 1008, the network entity sends the motion information to the target UE, e.g., as discussed at stages 1 and 3 of FIG. 5. In one implementation, the PRS configuration and the motion information may be sent in positioning assistance data. The positioning assistance data may further include a position of the mobile anchor node at a reference time, and the motion information for the mobile anchor node may be used to project a position of the mobile anchor node at a time of transmission of the PRS based on the position of the mobile anchor node at the reference time. In some implementations, the motion information may be represented by one of a path of motion, a surface of motion, or a volume of motion. Additionally, the positioning assistance data may further include one of a velocity or Doppler information for the mobile anchor node, wherein the target UE determines the PRS configuration based on velocity or Doppler information. A means for sending the motion information to the target UE may be, e.g., the external interface 812 and one or more processors 802 with dedicated hardware or implementing executable code or software instructions in memory 804 and/or medium 820 such as the motion information module 824 of location server 800; or the wireless transceiver 710 and one or more processors 702 with dedicated hardware or implementing executable code or software instructions in memory 704 and/or medium 720 such as the motion information module 724 of UE 700.

In some implementations, the network entity may be a location server and the location server may further receive a location information report from the target UE comprising at least one of positioning measurements for PRS received by the target UE from the mobile anchor node that are based on the motion information, a position of the target UE determined by the target UE based on positioning measurements for the PRS and the motion information for the mobile anchor node, or a combination thereof, e.g., as discussed at stage 9 of FIG. 5. A means for receiving a location information report from the target UE comprising at least one of positioning measurements for PRS received by the target UE from the mobile anchor node that are based on the motion information, a position of the target UE determined by the target UE based on positioning measurements for the PRS and the motion information for the mobile anchor node, or a combination thereof may be, e.g., the external interface 812 and one or more processors 802 with dedicated hardware or implementing executable code or software instructions in memory 804 and/or medium 820 such as the report module 826 of location server 800.

In some implementations, the network entity may be the mobile anchor node and the mobile anchor node may further send PRS to be measured by the target UE based on the motion information, e.g., as discussed at stage 6 of FIG. 5. A means for sending PRS to be measured by the target UE based on the motion information may be, e.g., the wireless transceiver 710 and one or more processors 702 with dedicated hardware or implementing executable code or software instructions in memory 704 and/or medium 720 such as the PRS module 726 of UE 700.

In some implementations, the motion information may be represented by an ordered list of points, e.g., as discussed in stages 1 and 3 of FIG. 5. For example, each point in the ordered list of points may include, relative to a previous point, a time increment, a position change, and an uncertainty in the position change. A priority of at least one of the PRS, the mobile anchor node, or a combination thereof may be determined based on the uncertainty in the position change, wherein the priority is an indicator of reliability, e.g., as discussed at stage 7 of FIG. 5. Each point may correspond to a past time or future time relative to reception of the motion information. Each point may correspond to a PRS occasion of the mobile anchor node.

Figure 11:
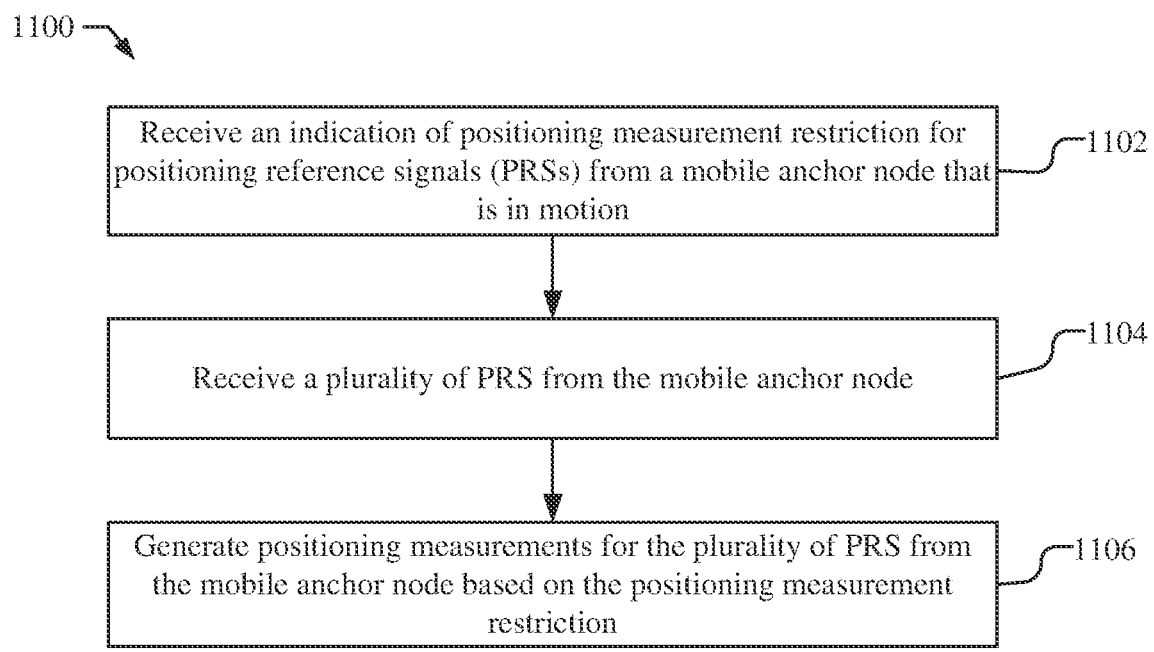
FIG. 11 shows a flowchart for an exemplary method performed by a target UE to support positioning of the target UE.

FIG. 11 shows a flowchart for an exemplary method 1100, e.g., performed by a target UE, such as UE 105, shown in FIGS. 1A, 2, 3, 4, 5, 6, and 7, to support positioning of the target UE, in a manner consistent with disclosed implementation.

At block 1102, the target UE receives an indication of positioning measurement restriction for positioning reference signals (PRSs) from a mobile anchor node that is in motion, e.g., as discussed at stages 1 and 3 of FIG. 6. In some implementations, the indication of positioning measurement restriction may be received from one of a location server or the mobile anchor node. A means for receiving an indication of positioning measurement restriction for positioning reference signals (PRSs) from a mobile anchor node that is in motion may be, e.g., the wireless transceiver 710 and one or more processors 702 with dedicated hardware or implementing executable code or software instructions in memory 704 and/or medium 720 such as the restriction module 736 of UE 700.

At block 1104, the target UE receives a plurality of PRS from the mobile anchor node, e.g., as discussed at stage 6 of FIG. 6. A means for receiving a plurality of PRS from the mobile anchor node may be, e.g., the wireless transceiver 710 and one or more processors 702 with dedicated hardware or implementing executable code or software instructions in memory 704 and/or medium 720 such as the PRS module 726 of UE 700.

At block 1108, the target UE generates positioning measurements for the plurality of PRS from the mobile anchor node based on the positioning measurement restriction, e.g., as discussed at stage 7 of FIG. 6. A means for generating positioning measurements for the plurality of PRS from the mobile anchor node based on the positioning measurement restriction may be, e.g., the one or more processors 702 with dedicated hardware or implementing executable code or software instructions in memory 704 and/or medium 720 such as the measurement module 728 of UE 700.

In some implementations, for example, the target UE generates the positioning measurements for the plurality of PRS from the mobile anchor node based on the positioning measurement restriction by restricting a number of PRS used for generating the positioning measurements, e.g., as discussed at stage 7 of FIG. 6. A means for generating the positioning measurements for the plurality of PRS from the mobile anchor node based on the positioning measurement restriction comprises restricting a number of PRS used for generating the positioning measurements may be, e.g., the one or more processors 702 with dedicated hardware or implementing executable code or software instructions in memory 704 and/or medium 720 such as the measurement module 728 of UE 700. For example, the target UE may restrict the number of PRS used for generating the positioning measurements by using only a most recent PRS for generating the positioning measurements, e.g., as discussed at stage 7 of FIG. 6. A means for using only a most recent PRS for generating the positioning measurements may be, e.g., the one or more processors 702 with dedicated hardware or implementing executable code or software instructions in memory 704 and/or medium 720 such as the measurement module 728 of UE 700.

In some implementations, for example, the target UE may generate the positioning measurements for the plurality of PRS from the mobile anchor node based on the positioning measurement restriction by generating positioning measurements for each of the plurality of PRS, e.g., as discussed at stage 7 of FIG. 6, and sending a location information report to a location server that separately reports each positioning measurement for each of the plurality of PRS, e.g., as discussed at stage 9 of FIG. 6. A means for generating positioning measurements for each of the plurality of PRS may be, e.g., the one or more processors 702 with dedicated hardware or implementing executable code or software instructions in memory 704 and/or medium 720 such as the measurement module 728 of UE 700. A means for sending a location information report to a location server that separately reports each positioning measurement for each of the plurality of PRS may be, e.g., the one or more processors 702 with dedicated hardware or implementing executable code or software instructions in memory 704 and/or medium 720 such as the report module 732 of UE 700.

In some implementations, the positioning measurement restriction may include filter coefficients, and the target UE may generate the positioning measurements for the plurality of PRS from the mobile anchor node based on the positioning measurement restriction by generating a positioning measurement for each of the plurality of PRS, e.g., as discussed at stage 7 of FIG. 6, and combining the positioning measurement for each of the plurality of PRS using the filter coefficients to produce a single filtered positioning measurement, e.g., as discussed at stage 7 of FIG. 6. A means for generating positioning measurements for each of the plurality of PRS may be, e.g., the one or more processors 702 with dedicated hardware or implementing executable code or software instructions in memory 704 and/or medium 720 such as the measurement module 728 of UE 700. A means for combining the positioning measurement for each of the plurality of PRS using the filter coefficients to produce a single filtered positioning measurement may be, e.g., the one or more processors 702 with dedicated hardware or implementing executable code or software instructions in memory 704 and/or medium 720 such as the measurement module 728 of UE 700.

The target UE, for example, may send a location information report to a location server that comprises the single filtered positioning measurement, e.g., as discussed at stage 9 of FIG. 6. A means for sending a location information report to a location server that comprises the single filtered positioning measurement may be, e.g., the one or more processors 702 with dedicated hardware or implementing executable code or software instructions in memory 704 and/or medium 720 such as the report module 732 of UE 700.

Figure 12:
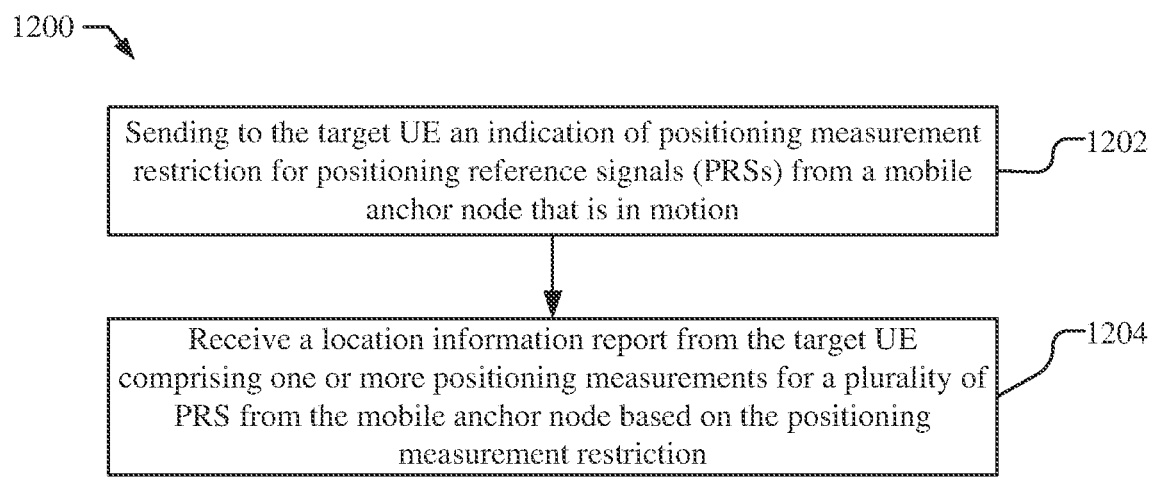
FIG. 12 shows a flowchart for an exemplary method performed by a location server to support positioning of a target UE.

FIG. 12 shows a flowchart for an exemplary method 1200, e.g., performed by a location server, such as location server 520, 620, 800 shown in FIGS. 5, 6, and 8, which may be an LMF 120, shown in FIGS. 1A and 3, to support positioning of a target UE, in a manner consistent with disclosed implementation.

At block 1202, the location server sends to the target UE an indication of positioning measurement restriction for positioning reference signals (PRSs) from a mobile anchor node that is in motion, e.g., as discussed at stages 1 and 3 of FIG. 6. A means for sending to the target UE an indication of positioning measurement restriction for positioning reference signals (PRSs) from a mobile anchor node that is in motion may be, e.g., the external interface 812 and one or more processors 802 with dedicated hardware or implementing executable code or software instructions in memory 804 and/or medium 820 such as the restriction module 832 of location server 800.

At block 1204, the location server receives a location information report from the target UE comprising one or more positioning measurements for a plurality of PRS from the mobile anchor node based on the positioning measurement restriction, e.g., as discussed at stage 9 of FIG. 6. A means for receiving a location information report from the target UE comprising one or more positioning measurements for a plurality of PRS from the mobile anchor node based on the positioning measurement restriction may be, e.g., the external interface 812 and one or more processors 802 with dedicated hardware or implementing executable code or software instructions in memory 804 and/or medium 820 such as the report module 826 of location server 800.

In some implementations, the location information report may include one positioning measurement generated based on a restricted number of PRS, e.g., as discussed at stage 9 of FIG. 6. The restricted number of PRS for example, may be only a most recent PRS.

In some implementations, the location information report may include a plurality of positioning measurements for each of the plurality of PRS separately measured by the target UE, e.g., as discussed at stage 9 of FIG. 6.

In some implementations, the positioning measurement restriction may include filter coefficients, and the location information report may include a single filtered positioning measurement generated based on a combination of positioning measurements for each of the plurality of PRS and the filter coefficients, e.g., as discussed at stages 1 and 9 of FIG. 6.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

While some of the techniques, processes, and/or implementations presented herein may comply with all or part of one or more standards, such techniques, processes, and/or implementations may not, in some embodiments, comply with part or all of such one or more standards.

In view of this description embodiments may include different combinations of features. Implementation examples are described in the following numbered clauses:

Clause 1. A method performed by a target user equipment (UE) for supporting positioning of the target UE, comprising: receiving a positioning reference signal (PRS) configuration for a mobile anchor node; receiving motion information for the mobile anchor node; receiving PRS from the mobile anchor node based on the PRS configuration; and generating position information for the UE based on the PRS and the motion information for the mobile anchor node.

Clause 2. The method of clause 1, wherein the PRS configuration and the motion information are received in positioning assistance data.

Clause 3. The method of clause 2, wherein the positioning assistance data further comprises a position of the mobile anchor node at a reference time, and the motion information for the mobile anchor node is used to project a position of the mobile anchor node at a time of transmission of the PRS based on the position of the mobile anchor node at the reference time.

Clause 4. The method of any of clauses 1-3, wherein generating the position information for the UE comprises determining positioning measurements for the PRS based on a priority of the PRS determined from the motion information for the mobile anchor node.

Clause 5. The method of any of clauses 1-3, wherein generating the position information for the UE comprises determining a position of the target UE based on positioning measurements for the PRS and the motion information for the mobile anchor node.

Clause 6. The method of any of clauses 1-5, further comprising sending a location information report to a location server that includes the position information for the UE.

Clause 7. The method of any of clauses 1-6, wherein the motion information is received from one of a location server, the mobile anchor node, an anchor node, or a base station.

Clause 8. The method of any of clauses 1-7, wherein the motion information is represented by an ordered list of points.

Clause 9. The method of clause 8, wherein each point in the ordered list of points comprises, relative to a previous point, a time increment, a position change, and an uncertainty in the position change.

Clause 10. The method of clause 9, further comprising determining a priority of at least one of the PRS, the mobile anchor node, or a combination thereof based on the uncertainty in the position change, wherein the priority is an indicator of reliability.

Clause 11. The method of any of clauses 8-10, wherein each point corresponds to a past time or future time relative to reception of the motion information.

Clause 12. The method of any of clauses 8-11, wherein each point corresponds to a PRS occasion of the mobile anchor node.

Clause 13. The method of any of clauses 1-12, wherein the motion information is represented by one of a path of motion, a surface of motion, or a volume of motion.

Clause 14. The method of any of clauses 2-13, wherein the positioning assistance data further comprises one of a velocity or Doppler information for the mobile anchor node, wherein the target UE determines the PRS configuration based on velocity or Doppler information.

Clause 15. A target user equipment (UE) configured for supporting positioning of the target UE, comprising: a wireless transceiver configured to communicate with entities in a wireless network; at least one memory; and at least one processor coupled to the wireless transceiver and the at least one memory, wherein the at least one processor is configured to: receive, via the wireless transceiver, a positioning reference signal (PRS) configuration for a mobile anchor node; receive, via the wireless transceiver, motion information for the mobile anchor node; receive, via the wireless transceiver, PRS from the mobile anchor node based on the PRS configuration; and generate position information for the UE based on the PRS and the motion information for the mobile anchor node.

Clause 16. The target UE of clause 15, wherein the PRS configuration and the motion information are received in positioning assistance data.

Clause 17. The target UE of clause 16, wherein the positioning assistance data further comprises a position of the mobile anchor node at a reference time, and the motion information for the mobile anchor node is used to project a position of the mobile anchor node at a time of transmission of the PRS based on the position of the mobile anchor node at the reference time.

Clause 18. The target UE of any of clauses 15-17, wherein the at least one processor is configured to generate the position information for the UE by being configured to determine positioning measurements for the PRS based on a priority of the PRS determined from the motion information for the mobile anchor node.

Clause 19. The target UE of any of clauses 15-17, wherein the at least one processor is configured to generate the position information for the UE by being configured to determine a position of the target UE based on positioning measurements for the PRS and the motion information for the mobile anchor node.

Clause 20. The target UE of any of clauses 15-19, wherein the at least one processor is further configured to send, via the wireless transceiver, a location information report to a location server that includes the position information for the UE.

Clause 21. The target UE of any of clauses 15-20, wherein the motion information is received from one of a location server, the mobile anchor node, an anchor node, or a base station.

Clause 22. The target UE of any of clauses 15-21, wherein the motion information is represented by an ordered list of points.

Clause 23. The target UE of clause 22, wherein each point in the ordered list of points comprises relative to a previous point a time increment, a position change, and an uncertainty in the position change.

Clause 24. The target UE of clause 23, wherein the at least one processor is further configured to determine a priority of at least one of the PRS, the mobile anchor node, or a combination thereof based on the uncertainty in the position change, wherein the priority is an indicator of reliability.

Clause 25. The target UE of any of clauses 22-24, wherein each point corresponds to a past time or future time relative to reception of the motion information.

Clause 26. The target UE of any of clauses 22-25, wherein each point corresponds to a PRS occasion of the mobile anchor node.

Clause 27. The target UE of any of clauses 15-26, wherein the motion information is represented by one of a path of motion, a surface of motion, or a volume of motion.

Clause 28. The target UE of any of clauses 16-27, wherein the positioning assistance data further comprises one of a velocity or Doppler information for the mobile anchor node, wherein the target UE determines the PRS configuration based on velocity or Doppler information.

Clause 29. A target user equipment (UE) configured for supporting positioning of the target UE, comprising: means for receiving a positioning reference signal (PRS) configuration for a mobile anchor node; means for receiving motion information for the mobile anchor node; means for receiving PRS from the mobile anchor node based on the PRS configuration; and means for generating position information for the UE based on the PRS and the motion information for the mobile anchor node.

Clause 30. The target UE of clause 29, wherein the PRS configuration and the motion information are received in positioning assistance data.

Clause 31. The target UE of clause 30, wherein the positioning assistance data further comprises a position of the mobile anchor node at a reference time, and the motion information for the mobile anchor node is used to project a position of the mobile anchor node at a time of transmission of the PRS based on the position of the mobile anchor node at the reference time.

Clause 32. The target UE of any of clauses 29-31, wherein the means for generating the position information for the UE comprises means for determining positioning measurements for the PRS based on a priority of the PRS determined from the motion information for the mobile anchor node.

Clause 33. The target UE of any of clauses 29-31, wherein the means for generating the position information for the UE comprises means for determining a position of the target UE based on positioning measurements for the PRS and the motion information for the mobile anchor node.

Clause 34. The target UE of any of clauses 29-33, further comprising means for sending a location information report to a location server that includes the position information for the UE.

Clause 35. The target UE of any of clauses 29-34, wherein the motion information is received from one of a location server, the mobile anchor node, an anchor node, or a base station.

Clause 36. The target UE of any of clauses 29-35, wherein the motion information is represented by an ordered list of points.

Clause 37. The target UE of clause 36, wherein each point in the ordered list of points comprises, relative to a previous point, a time increment, a position change, and an uncertainty in the position change.

Clause 38. The target UE of clause 37, further comprising means for determining a priority of at least one of the PRS, the mobile anchor node, or a combination thereof based on the uncertainty in the position change, wherein the priority is an indicator of reliability.

Clause 39. The target UE of any of clauses 36-38, wherein each point corresponds to a past time or future time relative to reception of the motion information.

Clause 40. The target UE of any of clauses 36-39, wherein each point corresponds to a PRS occasion of the mobile anchor node.

Clause 41. The target UE of any of clauses 29-40, wherein the motion information is represented by one of a path of motion, a surface of motion, or a volume of motion.

Clause 42. The target UE of any of clauses 30-41, wherein the positioning assistance data further comprises one of a velocity or Doppler information for the mobile anchor node, wherein the target UE determines the PRS configuration based on velocity or Doppler information.

Clause 43. A non-transitory storage medium including program code stored thereon, the program code is operable to configure at least one processor in a target user equipment (UE) configured for supporting positioning of the target UE, the program code comprising instructions to: receive a positioning reference signal (PRS) configuration for a mobile anchor node; receive motion information for the mobile anchor node; receive PRS from the mobile anchor node based on the PRS configuration; and generate position information for the UE based on the PRS and the motion information for the mobile anchor node.

Clause 44. The non-transitory storage medium of clause 43, wherein the PRS configuration and the motion information are received in positioning assistance data.

Clause 45. The non-transitory storage medium of clause 44, wherein the positioning assistance data further comprises a position of the mobile anchor node at a reference time, and the motion information for the mobile anchor node is used to project a position of the mobile anchor node at a time of transmission of the PRS based on the position of the mobile anchor node at the reference time.

Clause 46. The non-transitory storage medium of any of clauses 43-45, wherein the instructions to generate the position information for the UE comprises instructions to determine positioning measurements for the PRS based on a priority of the PRS determined from the motion information for the mobile anchor node.

Clause 47. The non-transitory storage medium of any of clauses 43-45, wherein the instructions to generate the position information for the UE comprises instructions to determine a position of the target UE based on positioning measurements for the PRS and the motion information for the mobile anchor node.

Clause 48. The non-transitory storage medium of any of clauses 43-47, wherein the program code further comprises instructions to send a location information report to a location server that includes the position information for the UE.

Clause 49. The non-transitory storage medium of any of clauses 43-48, wherein the motion information is received from one of a location server, the mobile anchor node, an anchor node, or a base station.

Clause 50. The non-transitory storage medium of any of clauses 43-49, wherein the motion information is represented by an ordered list of points.

Clause 51. The non-transitory storage medium of clause 50, wherein each point in the ordered list of points comprises relative to a previous point a time increment, a position change, and an uncertainty in the position change.

Clause 52. The non-transitory storage medium of clause 51, wherein the program code further comprises instructions to determine a priority of at least one of the PRS, the mobile anchor node, or a combination thereof based on the uncertainty in the position change, wherein the priority is an indicator of reliability.

Clause 53. The non-transitory storage medium of any of clauses 50-52, wherein each point corresponds to a past time or future time relative to reception of the motion information.

Clause 54. The non-transitory storage medium of any of clauses 50-53, wherein each point corresponds to a PRS occasion of the mobile anchor node.

Clause 55. The non-transitory storage medium of any of clauses 43-54, wherein the motion information is represented by one of a path of motion, a surface of motion, or a volume of motion.

Clause 56. The non-transitory storage medium of any of clauses 44-55, wherein the positioning assistance data further comprises one of a velocity or Doppler information for the mobile anchor node, wherein the target UE determines the PRS configuration based on velocity or Doppler information.

Clause 57. A method performed by a network entity for supporting positioning of a target user equipment (UE), comprising: obtaining a positioning reference signal (PRS) configuration for a mobile anchor node; obtaining motion information for the mobile anchor node; sending the PRS configuration to the target UE; and sending the motion information to the target UE.

Clause 58. The method of clause 57, wherein the PRS configuration and the motion information are sent in positioning assistance data.

Clause 59. The method of clause 58, wherein the positioning assistance data further comprises a position of the mobile anchor node at a reference time, and the motion information for the mobile anchor node is used to project a position of the mobile anchor node at a time of transmission of the PRS based on the position of the mobile anchor node at the reference time.

Clause 60. The method of any of clauses 57-59, wherein the network entity is a location server and the method further comprises receiving a location information report from the target UE comprising at least one of positioning measurements for PRS received by the target UE from the mobile anchor node that are based on the motion information, a position of the target UE determined by the target UE based on positioning measurements for the PRS and the motion information for the mobile anchor node, or a combination thereof.

Clause 61. The method of any of clauses 57-59, wherein the network entity is the mobile anchor node, the method further comprising sending PRS to be measured by the target UE based on the motion information.

Clause 62. The method of any of clauses 57-61, wherein the motion information is represented by an ordered list of points.

Clause 63. The method of clause 62, wherein each point in the ordered list of points comprises relative to a previous point a time increment, a position change, and an uncertainty in the position change.

Clause 64. The method of clause 63, wherein a priority of at least one of the PRS, the mobile anchor node, or a combination thereof is determined based on the uncertainty in the position change, wherein the priority is an indicator of reliability.

Clause 65. The method of any of clauses 62-64, wherein each point corresponds to a past time or future time relative to reception of the motion information.

Clause 66. The method of any of clauses 62-64, wherein each point corresponds to a PRS occasion of the mobile anchor node.

Clause 67. The method of any of clauses 57-66, wherein the motion information is represented by one of a path of motion, a surface of motion, or a volume of motion.

Clause 68. The method of any of clauses 58-67, wherein the positioning assistance data further comprises one of a velocity or Doppler information for the mobile anchor node, wherein the target UE determines the PRS configuration based on velocity or Doppler information.

Clause 69. A network entity configured for supporting positioning of a target user equipment (UE), comprising: an external interface configured to communicate with entities in a wireless network; at least one memory; and at least one processor coupled to the external interface and the at least one memory, wherein the at least one processor is configured to: obtain a positioning reference signal (PRS) configuration for a mobile anchor node; obtain motion information for the mobile anchor node; send, via the external interface, the PRS configuration to the target UE; and send, via the external interface, the motion information to the target UE.

Clause 70. The network entity of clause 69, wherein the PRS configuration and the motion information are sent in positioning assistance data.

Clause 71. The network entity of clause 70, wherein the positioning assistance data further comprises a position of the mobile anchor node at a reference time, and the motion information for the mobile anchor node is used to project a position of the mobile anchor node at a time of transmission of the PRS based on the position of the mobile anchor node at the reference time.

Clause 72. The network entity of any of clauses 69-71, wherein the network entity is a location server and the at least one processor is further configured to receive, via the external interface, a location information report from the target UE comprising at least one of positioning measurements for PRS received by the target UE from the mobile anchor node that are based on the motion information, a position of the target UE determined by the target UE based on positioning measurements for the PRS and the motion information for the mobile anchor node, or a combination thereof.

Clause 73. The network entity of any of clauses 69-71, wherein the network entity is the mobile anchor node, the at least one processor is further configured to send, via the external interface, PRS to be measured by the target UE based on the motion information.

Clause 74. The network entity of any of clauses 69-73, wherein the motion information is represented by an ordered list of points.

Clause 75. The network entity of clause 74, wherein each point in the ordered list of points comprises relative to a previous point a time increment, a position change, and an uncertainty in the position change.

Clause 76. The network entity of clause 75, wherein a priority of at least one of the PRS, the mobile anchor node, or a combination thereof is determined based on the uncertainty in the position change, wherein the priority is an indicator of reliability.

Clause 77. The network entity of any of clauses 74-76, wherein each point corresponds to a past time or future time relative to reception of the motion information.

Clause 78. The network entity of any of clauses 74-77, wherein each point corresponds to a PRS occasion of the mobile anchor node.

Clause 79. The network entity of any of clauses 69-78, wherein the motion information is represented by one of a path of motion, a surface of motion, or a volume of motion.

Clause 80. The network entity of any of clauses 70-79, wherein the positioning assistance data further comprises one of a velocity or Doppler information for the mobile anchor node, wherein the target UE determines the PRS configuration based on velocity or Doppler information.

Clause 81. A network entity configured for supporting positioning of a target user equipment (UE), comprising: means for obtaining a positioning reference signal (PRS) configuration for a mobile anchor node; means for obtaining motion information for the mobile anchor node; means for sending the PRS configuration to the target UE; and means for sending the motion information to the target UE.

Clause 82. The network entity of clause 81, wherein the PRS configuration and the motion information are sent in positioning assistance data.

Clause 83. The network entity of clause 82, wherein the positioning assistance data further comprises a position of the mobile anchor node at a reference time, and the motion information for the mobile anchor node is used to project a position of the mobile anchor node at a time of transmission of the PRS based on the position of the mobile anchor node at the reference time.

Clause 84. The network entity of any of clauses 81-83, wherein the network entity is a location server and further comprises means for receiving a location information report from the target UE comprising at least one of positioning measurements for PRS received by the target UE from the mobile anchor node that are based on the motion information, a position of the target UE determined by the target UE based on positioning measurements for the PRS and the motion information for the mobile anchor node, or a combination thereof.

Clause 85. The network entity of any of clauses 81-83, wherein the network entity is the mobile anchor node and further comprises means for sending PRS to be measured by the target UE based on the motion information.

Clause 86. The network entity of any of clauses 81-85, wherein the motion information is represented by an ordered list of points.

Clause 87. The network entity of clause 86, wherein each point in the ordered list of points comprises relative to a previous point a time increment, a position change, and an uncertainty in the position change.

Clause 88. The network entity of clause 87, wherein a priority of at least one of the PRS, the mobile anchor node, or a combination thereof is determined based on the uncertainty in the position change, wherein the priority is an indicator of reliability.

Clause 89. The network entity of any of clauses 86-88, wherein each point corresponds to a past time or future time relative to reception of the motion information.

Clause 90. The network entity of any of clauses 86-89, wherein each point corresponds to a PRS occasion of the mobile anchor node.

Clause 91. The network entity of any of clauses 81-90, wherein the motion information is represented by one of a path of motion, a surface of motion, or a volume of motion.

Clause 92. The network entity of any of clauses 82-91, wherein the positioning assistance data further comprises one of a velocity or Doppler information for the mobile anchor node, wherein the target UE determines the PRS configuration based on velocity or Doppler information.

Clause 93. A non-transitory storage medium including program code stored thereon, the program code is operable to configure at least one processor in a network entity for supporting positioning of a target user equipment (UE), the program code comprising instructions to: obtain a positioning reference signal (PRS) configuration for a mobile anchor node; obtain motion information for the mobile anchor node; send the PRS configuration to the target UE; and send the motion information to the target UE.

Clause 94. The non-transitory storage medium of clause 93, wherein the PRS configuration and the motion information are sent in positioning assistance data.

Clause 95. The non-transitory storage medium of clause 94, wherein the positioning assistance data further comprises a position of the mobile anchor node at a reference time, and the motion information for the mobile anchor node is used to project a position of the mobile anchor node at a time of transmission of the PRS based on the position of the mobile anchor node at the reference time.

Clause 96. The non-transitory storage medium of any of clauses 93-95, wherein the network entity is a location server and the program code further comprises instructions to receive a location information report from the target UE comprising at least one of positioning measurements for PRS received by the target UE from the mobile anchor node that are based on the motion information, a position of the target UE determined by the target UE based on positioning measurements for the PRS and the motion information for the mobile anchor node, or a combination thereof.

Clause 97. The non-transitory storage medium of any of clauses 93-95, wherein the network entity is the mobile anchor node and the program code further comprises instructions to send PRS to be measured by the target UE based on the motion information.

Clause 98. The non-transitory storage medium of any of clauses 93-97, wherein the motion information is represented by an ordered list of points.

Clause 99. The non-transitory storage medium of clause 98, wherein each point in the ordered list of points comprises relative to a previous point a time increment, a position change, and an uncertainty in the position change.

Clause 100. The non-transitory storage medium of clause 99, wherein a priority of at least one of the PRS, the mobile anchor node, or a combination thereof is determined based on the uncertainty in the position change, wherein the priority is an indicator of reliability.

Clause 101. The non-transitory storage medium of any of clauses 98-100, wherein each point corresponds to a past time or future time relative to reception of the motion information.

Clause 102. The non-transitory storage medium of any of clauses 98-100, wherein each point corresponds to a PRS occasion of the mobile anchor node.

Clause 103. The non-transitory storage medium of any of clauses 93-102, wherein the motion information is represented by one of a path of motion, a surface of motion, or a volume of motion.

Clause 104. The non-transitory storage medium of any of clauses 94-103, wherein the positioning assistance data further comprises one of a velocity or Doppler information for the mobile anchor node, wherein the target UE determines the PRS configuration based on velocity or Doppler information.

Clause 105. A method performed by a target user equipment (UE) for supporting positioning of the target UE, comprising: receiving an indication of positioning measurement restriction for positioning reference signals (PRSs) from a mobile anchor node that is in motion; receiving a plurality of PRS from the mobile anchor node; and generating positioning measurements for the plurality of PRS from the mobile anchor node based on the positioning measurement restriction.

Clause 106. The method of clause 105, wherein generating the positioning measurements for the plurality of PRS from the mobile anchor node based on the positioning measurement restriction comprises restricting a number of PRS used for generating the positioning measurements.

Clause 107. The method of clause 106, wherein restricting the number of PRS used for generating the positioning measurements comprises using only a most recent PRS for generating the positioning measurements.

Clause 108. The method of clause 105, wherein generating the positioning measurements for the plurality of PRS from the mobile anchor node based on the positioning measurement restriction comprises: generating positioning measurements for each of the plurality of PRS; and sending a location information report to a location server that separately reports each positioning measurement for each of the plurality of PRS.

Clause 109. The method of clause 105, wherein the positioning measurement restriction comprises filter coefficients, wherein generating the positioning measurements for the plurality of PRS from the mobile anchor node based on the positioning measurement restriction comprises: generating a positioning measurement for each of the plurality of PRS; and combining the positioning measurement for each of the plurality of PRS using the filter coefficients to produce a single filtered positioning measurement.

Clause 110. The method of clause 109, further comprising sending a location information report to a location server that comprises the single filtered positioning measurement.

Clause 111. The method of any of clauses 105-110, wherein the indication of positioning measurement restriction is received from one of a location server or the mobile anchor node.

Clause 112. A target user equipment (UE) configured for supporting positioning of the target UE, comprising: a wireless transceiver configured to communicate with entities in a wireless network; at least one memory; and at least one processor coupled to the wireless transceiver and the at least one memory, wherein the at least one processor is configured to: receive, via the wireless transceiver, an indication of positioning measurement restriction for positioning reference signals (PRSs) from a mobile anchor node that is in motion; receive, via the wireless transceiver, a plurality of PRS from the mobile anchor node; and generate positioning measurements for the plurality of PRS from the mobile anchor node based on the positioning measurement restriction.

Clause 113. The target UE of clause 112, wherein the at least one processor is configured to generate the positioning measurements for the plurality of PRS from the mobile anchor node based on the positioning measurement restriction by being configured to restrict a number of PRS used for generating the positioning measurements.

Clause 114. The target UE of clause 113, wherein the at least one processor is configured to restrict the number of PRS used for generating the positioning measurements by being configured to use only a most recent PRS for generating the positioning measurements.

Clause 115. The target UE of clause 112, wherein the at least one processor is configured to generate the positioning measurements for the plurality of PRS from the mobile anchor node based on the positioning measurement restriction by being configured to: generate positioning measurements for each of the plurality of PRS; and send, via the wireless, transceiver, a location information report to a location server that separately reports each positioning measurement for each of the plurality of PRS.

Clause 116. The target UE of clause 112, wherein the positioning measurement restriction comprises filter coefficients, wherein the at least one processor is configured to generate the positioning measurements for the plurality of PRS from the mobile anchor node based on the positioning measurement restriction by being configured to: generate a positioning measurement for each of the plurality of PRS; and combine the positioning measurement for each of the plurality of PRS using the filter coefficients to produce a single filtered positioning measurement.

Clause 117. The target UE of clause 116, wherein the at least one processor is further configured to send, via the wireless transceiver, a location information report to a location server that comprises the single filtered positioning measurement.

Clause 118. The target UE of any of clauses 112-117, wherein the indication of positioning measurement restriction is received from one of a location server or the mobile anchor node.

Clause 119. A target user equipment (UE) configured for supporting positioning of the target UE, comprising: means for receiving an indication of positioning measurement restriction for positioning reference signals (PRSs) from a mobile anchor node that is in motion; means for receiving a plurality of PRS from the mobile anchor node; and means for generating positioning measurements for the plurality of PRS from the mobile anchor node based on the positioning measurement restriction.

Clause 120. The target UE of clause 119, wherein the means for generating the positioning measurements for the plurality of PRS from the mobile anchor node based on the positioning measurement restriction comprises means for restricting a number of PRS used for generating the positioning measurements.

Clause 121. The target UE of clause 120, wherein the means for restricting the number of PRS used for generating the positioning measurements uses only a most recent PRS for generating the positioning measurements.

Clause 122. The target UE of clause 119, wherein the means for generating the positioning measurements for the plurality of PRS from the mobile anchor node based on the positioning measurement restriction comprises: means for generating positioning measurements for each of the plurality of PRS; and means for sending a location information report to a location server that separately reports each positioning measurement for each of the plurality of PRS.

Clause 123. The target UE of clause 119, wherein the positioning measurement restriction comprises filter coefficients, wherein the means for generating the positioning measurements for the plurality of PRS from the mobile anchor node based on the positioning measurement restriction comprises: means for generating a positioning measurement for each of the plurality of PRS; and means for combining the positioning measurement for each of the plurality of PRS using the filter coefficients to produce a single filtered positioning measurement.

Clause 124. The target UE of clause 123, further comprising means for sending a location information report to a location server that comprises the single filtered positioning measurement.

Clause 125. The target UE of any of clauses 119-124, wherein the indication of positioning measurement restriction is received from one of a location server or the mobile anchor node.

Clause 126. A non-transitory storage medium including program code stored thereon, the program code is operable to configure at least one processor in a target user equipment (UE) for supporting positioning of the target UE, the program code comprising instructions to: receive an indication of positioning measurement restriction for positioning reference signals (PRSs) from a mobile anchor node that is in motion; receive a plurality of PRS from the mobile anchor node; and generate positioning measurements for the plurality of PRS from the mobile anchor node based on the positioning measurement restriction.

Clause 127. The non-transitory storage medium of clause 126, wherein the instructions to generate the positioning measurements for the plurality of PRS from the mobile anchor node based on the positioning measurement restriction comprises instructions to restrict a number of PRS used for generating the positioning measurements.

Clause 128. The non-transitory storage medium of clause 127, wherein the instructions to restrict the number of PRS used for generating the positioning measurements uses use only a most recent PRS for generating the positioning measurements.

Clause 129. The non-transitory storage medium of clause 126, wherein the instructions to generate the positioning measurements for the plurality of PRS from the mobile anchor node based on the positioning measurement restriction comprises instructions to: generate positioning measurements for each of the plurality of PRS; and send transceiver, a location information report to a location server that separately reports each positioning measurement for each of the plurality of PRS.

Clause 130. The non-transitory storage medium of clause 126, wherein the positioning measurement restriction comprises filter coefficients, wherein the instructions to generate the positioning measurements for the plurality of PRS from the mobile anchor node based on the positioning measurement restriction comprises instructions to: generate a positioning measurement for each of the plurality of PRS; and combine the positioning measurement for each of the plurality of PRS using the filter coefficients to produce a single filtered positioning measurement.

Clause 131. The non-transitory storage medium of clause 130, wherein the program code further comprises instructions to send a location information report to a location server that comprises the single filtered positioning measurement.

Clause 132. The non-transitory storage medium of any of clauses 126-131, wherein the indication of positioning measurement restriction is received from one of a location server or the mobile anchor node.

Clause 133. A method performed by a location server for supporting positioning of a target user equipment (UE), comprising: sending to the target UE an indication of positioning measurement restriction for positioning reference signals (PRSs) from a mobile anchor node that is in motion; and receiving a location information report from the target UE comprising one or more positioning measurements for a plurality of PRS from the mobile anchor node based on the positioning measurement restriction.

Clause 134. The method of clause 133, wherein the location information report comprises one positioning measurement generated based on a restricted number of PRS.

Clause 135. The method of clause 134, wherein the restricted number of PRS comprises only a most recent PRS.

Clause 136. The method of clause 133, wherein the location information report comprises a plurality of positioning measurements for each of the plurality of PRS separately measured by the target UE.

Clause 137. The method of clause 133, wherein the positioning measurement restriction comprises filter coefficients, wherein the location information report comprises a single filtered positioning measurement generated based on a combination of positioning measurements for each of the plurality of PRS and the filter coefficients.

Clause 138. A location server configured for supporting positioning of a target user equipment (UE), comprising: an external interface configured to communicate with entities in a wireless network; at least one memory; and at least one processor coupled to the external interface and the at least one memory, wherein the at least one processor is configured to: send, via the external interface, to the target UE an indication of positioning measurement restriction for positioning reference signals (PRSs) from a mobile anchor node that is in motion; and receive, via the external interface, a location information report from the target UE comprising one or more positioning measurements for a plurality of PRS from the mobile anchor node based on the positioning measurement restriction.

Clause 139. The location server of clause 138, wherein the location information report comprises one positioning measurement generated based on a restricted number of PRS.

Clause 140. The location server of clause 139, wherein the restricted number of PRS comprises only a most recent PRS.

Clause 141. The location server of clause 138, wherein the location information report comprises a plurality of positioning measurements for each of the plurality of PRS separately measured by the target UE.

Clause 142. The location server of clause 138, wherein the positioning measurement restriction comprises filter coefficients, wherein the location information report comprises a single filtered positioning measurement generated based on a combination of positioning measurements for each of the plurality of PRS and the filter coefficients.

Clause 143. A location server configured for supporting positioning of a target user equipment (UE), comprising: means for sending to the target UE an indication of positioning measurement restriction for positioning reference signals (PRSs) from a mobile anchor node that is in motion; and means for receiving a location information report from the target UE comprising one or more positioning measurements for a plurality of PRS from the mobile anchor node based on the positioning measurement restriction.

Clause 144. The location server of clause 143, wherein the location information report comprises one positioning measurement generated based on a restricted number of PRS.

Clause 145. The location server of clause 144, wherein the restricted number of PRS comprises only a most recent PRS.

Clause 146. The location server of clause 143, wherein the location information report comprises a plurality of positioning measurements for each of the plurality of PRS separately measured by the target UE.

Clause 147. The location server of clause 143, wherein the positioning measurement restriction comprises filter coefficients, wherein the location information report comprises a single filtered positioning measurement generated based on a combination of positioning measurements for each of the plurality of PRS and the filter coefficients.

Clause 148. A non-transitory storage medium including program code stored thereon, the program code is operable to configure at least one processor in a location server for supporting positioning of a target user equipment (UE), the program code comprising instructions to: send to the target UE an indication of positioning measurement restriction for positioning reference signals (PRSs) from a mobile anchor node that is in motion; and receive a location information report from the target UE comprising one or more positioning measurements for a plurality of PRS from the mobile anchor node based on the positioning measurement restriction.

Clause 149. The non-transitory storage medium of clause 148, wherein the location information report comprises one positioning measurement generated based on a restricted number of PRS.

Clause 150. The non-transitory storage medium of clause 149, wherein the restricted number of PRS comprises only a most recent PRS.

Clause 151. The non-transitory storage medium of clause 148, wherein the location information report comprises a plurality of positioning measurements for each of the plurality of PRS separately measured by the target UE.

Clause 152. The non-transitory storage medium of clause 148, wherein the positioning measurement restriction comprises filter coefficients, wherein the location information report comprises a single filtered positioning measurement generated based on a combination of positioning measurements for each of the plurality of PRS and the filter coefficients.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the disclosure as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method performed by a target user equipment (UE) for supporting positioning of the target UE, comprising:
   receiving a positioning reference signal (PRS) configuration for a mobile anchor node;
   receiving motion information for the mobile anchor node;
   receiving PRS from the mobile anchor node based on the PRS configuration; and
   generating position information for the target UE based on the PRS and the motion information for the mobile anchor node,
   wherein the PRS configuration and the motion information are received in positioning assistance data, and wherein the positioning assistance data further comprises a position of the mobile anchor node at a reference time, and the motion information for the mobile anchor node is used to project a position of the mobile anchor node at a time of transmission of the PRS based on the position of the mobile anchor node at the reference time.

2. The method of claim 1, wherein generating the position information for the target UE comprises determining a position of the target UE based on positioning measurements for the PRS and the motion information for the mobile anchor node.

3. The method of claim 1, further comprising sending a location information report to a location server that includes the position information for the target UE.

4. The method of claim 1, wherein the motion information is received from one of a location server, the mobile anchor node, an anchor node, or a base station.

5. The method of claim 1, wherein the motion information is represented by one of a path of motion, a surface of motion, or a volume of motion.

6. The method of claim 1, wherein the positioning assistance data further comprises one of a velocity or Doppler information for the mobile anchor node, wherein the target UE determines the PRS configuration based on velocity or Doppler information.

7. A method performed by a target user equipment (UE) for supporting positioning of the target UE, comprising:
   receiving a positioning reference signal (PRS) configuration for a mobile anchor node;
   receiving motion information for the mobile anchor node;
   receiving PRS from the mobile anchor node based on the PRS configuration; and
   generating position information for the target UE based on the PRS and the motion information for the mobile anchor node, wherein generating the position information for the target UE comprises determining positioning measurements for the PRS based on a priority of the PRS determined from the motion information for the mobile anchor node.

8. A method performed by a target user equipment (UE) for supporting positioning of the target UE, comprising:
   receiving a positioning reference signal (PRS) configuration for a mobile anchor node;
   receiving motion information for the mobile anchor node, wherein the motion information is represented by an ordered list of points;

receiving PRS from the mobile anchor node based on the PRS configuration; and generating position information for the target UE based on the PRS and the motion information for the mobile anchor node.

9. The method of claim 8, wherein each point in the ordered list of points comprises, relative to a previous point, a time increment, a position change, and an uncertainty in the position change.

10. The method of claim 9, further comprising determining a priority of at least one of the PRS, the mobile anchor node, or a combination thereof based on the uncertainty in the position change, wherein the priority is an indicator of reliability.

11. The method of claim 8, wherein each point corresponds to a past time or future time relative to reception of the motion information.

12. The method of claim 8, wherein each point corresponds to a PRS occasion of the mobile anchor node.

13. A target user equipment (UE) configured for supporting positioning of the target UE, comprising:
a wireless transceiver configured to communicate with entities in a wireless network;
at least one memory; and
at least one processor coupled to the wireless transceiver and the at least one memory, wherein the at least one processor is configured to:
receive, via the wireless transceiver, a positioning reference signal (PRS) configuration for a mobile anchor node;
receive, via the wireless transceiver, motion information for the mobile anchor node;
receive, via the wireless transceiver, PRS from the mobile anchor node based on the PRS configuration; and
generate position information for the target UE based on the PRS and the motion information for the mobile anchor node,
wherein the PRS configuration and the motion information are received in positioning assistance data, and wherein the positioning assistance data further comprises a position of the mobile anchor node at a reference time, and the motion information for the mobile anchor node is used to project a position of the mobile anchor node at a time of transmission of the PRS based on the position of the mobile anchor node at the reference time.

14. The target UE of claim 13, wherein the at least one processor is configured to generate the position information for the target UE by being configured to determine a position of the target UE based on positioning measurements for the PRS and the motion information for the mobile anchor node.

15. The target UE of claim 13, wherein the at least one processor is further configured to send, via the wireless transceiver, a location information report to a location server that includes the position information for the target UE.

16. The target UE of claim 13, wherein the motion information is received from one of a location server, the mobile anchor node, an anchor node, or a base station.

17. The target UE of claim 13, wherein the motion information is represented by one of a path of motion, a surface of motion, or a volume of motion.

18. The target UE of claim 13, wherein the positioning assistance data further comprises one of a velocity or Doppler information for the mobile anchor node, wherein the target UE determines the PRS configuration based on velocity or Doppler information.

19. A target user equipment (UE) configured for supporting positioning of the target UE, comprising:
a wireless transceiver configured to communicate with entities in a wireless network;
at least one memory; and
at least one processor coupled to the wireless transceiver and the at least one memory, wherein the at least one processor is configured to:
receive, via the wireless transceiver, a positioning reference signal (PRS) configuration for a mobile anchor node;
receive, via the wireless transceiver, motion information for the mobile anchor node;
receive, via the wireless transceiver, PRS from the mobile anchor node based on the PRS configuration; and
generate position information for the target UE based on the PRS and the motion information for the mobile anchor node, wherein the at least one processor is configured to generate the position information for the target UE by being configured to determine positioning measurements for the PRS based on a priority of the PRS determined from the motion information for the mobile anchor node.

20. A target user equipment (UE) configured for supporting positioning of the target UE, comprising:
a wireless transceiver configured to communicate with entities in a wireless network;
at least one memory; and
at least one processor coupled to the wireless transceiver and the at least one memory, wherein the at least one processor is configured to:
receive, via the wireless transceiver, a positioning reference signal (PRS) configuration for a mobile anchor node;
receive, via the wireless transceiver, motion information for the mobile anchor node, wherein the motion information is represented by an ordered list of points;
receive, via the wireless transceiver, PRS from the mobile anchor node based on the PRS configuration; and
generate position information for the target UE based on the PRS and the motion information for the mobile anchor node.

21. The target UE of claim 20, wherein each point in the ordered list of points comprises relative to a previous point a time increment, a position change, and an uncertainty in the position change.

22. The target UE of claim 21, wherein the at least one processor is further configured to determine a priority of at least one of the PRS, the mobile anchor node, or a combination thereof based on the uncertainty in the position change, wherein the priority is an indicator of reliability.

23. The target UE of claim 20, wherein each point corresponds to a past time or future time relative to reception of the motion information.

24. The target UE of claim 20, wherein each point corresponds to a PRS occasion of the mobile anchor node.

25. A method performed by a network entity for supporting positioning of a target user equipment (UE), comprising:
obtaining a positioning reference signal (PRS) configuration for a mobile anchor node;
obtaining motion information for the mobile anchor node;
sending the PRS configuration to the target UE; and
sending the motion information to the target UE,
wherein the PRS configuration and the motion information are sent in positioning assistance data and wherein the positioning assistance data further comprises a position of the mobile anchor node at a reference time, and the motion information for the mobile anchor node is used to project a position of the mobile anchor node at a time of transmission of the PRS based on the position of the mobile anchor node at the reference time.

26. The method of claim 25, wherein the network entity is a location server and the method further comprises receiving a location information report from the target UE comprising at least one of positioning measurements for PRS received by the target UE from the mobile anchor node that are based on the motion information, a position of the target UE determined by the target UE based on positioning measurements for the PRS and the motion information for the mobile anchor node, or a combination thereof.

27. The method of claim 25, wherein the network entity is the mobile anchor node, the method further comprising sending PRS to be measured by the target UE based on the motion information.

28. The method of claim 25, wherein the motion information is represented by one of a path of motion, a surface of motion, or a volume of motion.

29. The method of claim 25, wherein the positioning assistance data further comprises one of a velocity or Doppler information for the mobile anchor node, wherein the target UE determines the PRS configuration based on velocity or Doppler information.

30. A method performed by a network entity for supporting positioning of a target user equipment (UE), comprising:
obtaining a positioning reference signal (PRS) configuration for a mobile anchor node;
obtaining motion information for the mobile anchor node;
sending the PRS configuration to the target UE; and
sending the motion information to the target UE, wherein the motion information is represented by an ordered list of points.

31. The method of claim 30, wherein each point in the ordered list of points comprises relative to a previous point a time increment, a position change, and an uncertainty in the position change.

32. The method of claim 31, wherein a priority of at least one of the PRS, the mobile anchor node, or a combination thereof is determined based on the uncertainty in the position change, wherein the priority is an indicator of reliability.

33. The method of claim 30, wherein each point corresponds to a past time or future time relative to reception of the motion information.

34. The method of claim 30, wherein each point corresponds to a PRS occasion of the mobile anchor node.

35. A network entity configured for supporting positioning of a target user equipment (UE), comprising:
an external interface configured to communicate with entities in a wireless network;
at least one memory; and
at least one processor coupled to the external interface and the at least one memory, wherein the at least one processor is configured to:
obtain a positioning reference signal (PRS) configuration for a mobile anchor node;
obtain motion information for the mobile anchor node;
send, via the external interface, the PRS configuration to the target UE; and
send, via the external interface, the motion information to the target UE,
wherein the PRS configuration and the motion information are sent in positioning assistance data and wherein the positioning assistance data further comprises a position of the mobile anchor node at a reference time, and the motion information for the mobile anchor node is used to project a position of the mobile anchor node at a time of transmission of the PRS based on the position of the mobile anchor node at the reference time.

36. The network entity of claim 35, wherein the network entity is a location server and the at least one processor is further configured to receive, via the external interface, a location information report from the target UE comprising at least one of positioning measurements for PRS received by the target UE from the mobile anchor node that are based on the motion information, a position of the target UE determined by the target UE based on positioning measurements for the PRS and the motion information for the mobile anchor node, or a combination thereof.

37. The network entity of claim 35, wherein the network entity is the mobile anchor node, the at least one processor is further configured to send, via the external interface, PRS to be measured by the target UE based on the motion information.

38. The network entity of claim 35, wherein the motion information is represented by one of a path of motion, a surface of motion, or a volume of motion.

39. The network entity of claim 35, wherein the positioning assistance data further comprises one of a velocity or Doppler information for the mobile anchor node, wherein the target UE determines the PRS configuration based on velocity or Doppler information.

40. A network entity configured for supporting positioning of a target user equipment (UE), comprising:
an external interface configured to communicate with entities in a wireless network;
at least one memory; and
at least one processor coupled to the external interface and the at least one memory, wherein the at least one processor is configured to:
obtain a positioning reference signal (PRS) configuration for a mobile anchor node;
obtain motion information for the mobile anchor node;
send, via the external interface, the PRS configuration to the target UE; and
send, via the external interface, the motion information to the target UE, wherein the motion information is represented by an ordered list of points.

41. The network entity of claim 40, wherein each point in the ordered list of points comprises relative to a previous point a time increment, a position change, and an uncertainty in the position change.

42. The network entity of claim 41, wherein a priority of at least one of the PRS, the mobile anchor node, or a combination thereof is determined based on the uncertainty in the position change, wherein the priority is an indicator of reliability.

43. The network entity of claim 40, wherein each point corresponds to a past time or future time relative to reception of the motion information.

44. The network entity of claim 40, wherein each point corresponds to a PRS occasion of the mobile anchor node.

* * * * *